United States Patent
Ho et al.

(10) Patent No.: US 12,407,910 B2
(45) Date of Patent: Sep. 2, 2025

(54) TACTILE FEEDBACK MECHANISM

(71) Applicant: TDK TAIWAN CORP., Taoyuan (TW)

(72) Inventors: Liang-Ting Ho, Taoyuan (TW);
Che-Wei Chang, Taoyuan (TW);
Chao-Chang Hu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 630 days.

(21) Appl. No.: 17/486,354

(22) Filed: Sep. 27, 2021

(65) Prior Publication Data

US 2022/0103053 A1 Mar. 31, 2022

Related U.S. Application Data

(60) Provisional application No. 63/084,312, filed on Sep. 28, 2020.

(51) Int. Cl.
| | | |
|---|---|---|
| H02K 33/02 | (2006.01) | |
| G02B 7/02 | (2021.01) | |
| G02B 7/04 | (2021.01) | |
| G02B 7/08 | (2021.01) | |
| G02B 7/09 | (2021.01) | |
| G02B 27/62 | (2006.01) | |
| G02B 27/64 | (2006.01) | |
| G03B 5/00 | (2021.01) | |
| H02K 33/06 | (2006.01) | |
(Continued)

(52) U.S. Cl.
CPC ............ *H04N 23/55* (2023.01); *G02B 7/025* (2013.01); *G02B 7/04* (2013.01); *G02B 7/08* (2013.01); *G02B 7/09* (2013.01); *G02B 27/62* (2013.01); *G02B 27/646* (2013.01); *G03B 5/00* (2013.01); *H02K 33/02* (2013.01); *H02K 33/06* (2013.01); *H02K 33/18* (2013.01); *H04N 23/51* (2023.01); *H04N 23/60* (2023.01); *G01D 5/12* (2013.01); *G03B 2205/0069* (2013.01)

(58) Field of Classification Search
CPC ........ H02K 33/00–35/06; H02K 7/063; H02K 5/207
See application file for complete search history.

(56) References Cited

U.S. PATENT DOCUMENTS 10,596,594 B2 * 3/2020 Ling .................. H02K 33/02
2019/0052160 A1 * 2/2019 Ol ...................... H02K 33/02

FOREIGN PATENT DOCUMENTS

CN 103973069 A * 8/2014 ............. H02K 33/00
CN 105720775 A * 6/2016 ............. H02K 33/02
(Continued)

OTHER PUBLICATIONS

Office Action mailed Feb. 10, 2022 in CN Application No. 202122366905.9, 2 pages.

*Primary Examiner* — Sean Kayes
(74) *Attorney, Agent, or Firm* — Muncy, Geissler, Olds & Lowe, P.C.

(57) ABSTRACT

A tactile feedback mechanism is provided, including a movable portion, a fixed portion, a driving assembly, and a connecting assembly. The movable portion is movable relative to the fixed portion. The driving assembly is configured to drive the movable portion to move relative to the fixed portion. The movable portion is movably connected to the fixed portion via the connecting assembly. The connecting assembly is made of a metal material.

18 Claims, 19 Drawing Sheets

(51) Int. Cl.
*H02K 33/18* (2006.01)
*H04N 23/51* (2023.01)
*H04N 23/55* (2023.01)
*H04N 23/60* (2023.01)
*G01D 5/12* (2006.01)

(56) References Cited

FOREIGN PATENT DOCUMENTS

CN 113126313 A 7/2021
KR 20190109010 A * 9/2019 ............. H02K 33/16

* cited by examiner

TACTILE FEEDBACK MECHANISM

CROSS REFERENCE TO RELATED APPLICATIONS

This application claims the benefit of U.S. Provisional Application No. 63/084,312, filed Sep. 28, 2020, the entirety of which are incorporated by reference herein.

BACKGROUND OF THE INVENTION

Field of the Invention

The present disclosure relates to a tactile feedback mechanism, and more particularly to a tactile feedback mechanism including a connecting assembly.

Description of the Related Art

Many electronic devices (for example, mobile phones, tablets, etc.) used nowadays, generally include a tactile feedback mechanism that generates vibrations, to respond to the operation made by the user on the electronic device. Many tactile feedback mechanisms in the prior art used eccentric rotating mass (ERM) motors. However, since its vibration is generated by the rotation of the eccentric mass (rotor), it is not conducive to the miniaturization of the mechanism, and it is not easy to accurately control it.

In this regard, the present disclosure provide a tactile feedback mechanism based on a linear resonance actuator (LRA) to generate vibrations. Compared with the tactile feedback mechanism used in the prior art, the tactile feedback mechanism improves in the vibration frequency, vibration intensity, and systematic evaluation.

BRIEF SUMMARY OF THE INVENTION

The present invention provides a tactile feedback mechanism, including a movable portion, a fixed portion, a driving assembly, and a connecting assembly. The movable portion is movable relative to the fixed portion. The driving assembly is configured to drive the movable portion to move relative to the fixed portion. The movable portion is movably connected to the fixed portion via the connecting assembly. The connecting assembly has a metal material.

According to some embodiments of the present disclosure, the connecting assembly includes a first fixed end for the movable portion, a first fixed end for the fixed portion, a first elastic portion. The first fixed end for the movable portion is fixedly connected to the movable portion. The first fixed end for the fixed portion is fixedly connected to the fixed portion. The first fixed end for the movable portion is connected to the first fixed end for the fixed portion via the first elastic portion. The first elastic portion has a metal material. The movable portion has a metal material. The metal material of the first elastic portion is different from the metal material of the movable portion. The density of the metal material of the first elastic portion is lower than the density of the metal material of the movable portion.

According to some embodiments of the present disclosure, the connecting assembly further includes a second fixed end for the movable portion and a second elastic portion. The second fixed end for the movable portion is fixedly connected to the movable portion. The second fixed end for the movable portion is connected to the first fixed end for the fixed portion via the second elastic portion. The first fixed end for the movable portion is connected to the second fixed end for the movable portion via the first fixed end for the fixed portion. The first fixed end for the movable portion, the first fixed end for the fixed portion, and the second fixed end for the movable portion are formed in one piece.

According to some embodiments of the present disclosure, the fixed portion includes a first sidewall. The first fixed end for the fixed portion is disposed on the first sidewall. The movable portion includes a first stopper portion for limiting the range of movement of the movable portion relative to the fixed portion. When the movable portion is in a first limiting position, the first stopper portion directly or indirectly contacts the first fixed end for the fixed portion.

According to some embodiments of the present disclosure, the tactile feedback mechanism further includes a first buffer component. The first buffer component has a plastic material. The first buffer component is fixedly disposed on the first stopper portion or the first fixed end for the fixed portion.

According to some embodiments of the present disclosure, the movable portion includes a first connecting portion and a second connecting portion. The first fixed end for the movable portion is fixed to the first connecting portion. The second fixed end for the movable portion is fixed to the second connecting portion. The first connecting portion and the second connecting portion both have a recessed structure.

According to some embodiments of the present disclosure, the first connecting portion includes a first connecting surface. The second connecting portion includes a second connecting surface. The first fixed end for the movable portion is disposed on the first connecting surface. The second fixed end for the movable portion is disposed on the second connecting surface. The fixed portion includes a second sidewall, the first fixed end for the movable portion and the second fixed end for the movable portion are arranged along a first axis. The first connecting surface and the second connecting surface face the second sidewall.

According to some embodiments of the present disclosure, the connecting assembly further includes a second fixed end for the fixed portion and a second elastic portion. The second fixed end for the fixed portion is fixedly connected to the fixed portion. The first fixed end for the movable portion is connected to the second fixed end for the fixed portion via the second elastic portion. The first fixed end for the fixed portion is connected to the second fixed end for the fixed portion via the first fixed end for the movable portion. The first fixed end for the movable portion, the first fixed end for the fixed portion, and the second fixed end for the fixed portion are formed in one piece. The first fixed end for the fixed portion and the second fixed end for the fixed portion are arranged along a first axis.

According to some embodiments of the present disclosure, the fixed portion includes a first sidewall. The first fixed end for the fixed portion and the second fixed end for the fixed portion are disposed on the first sidewall. The first fixed end for the movable portion, the first fixed end for the fixed portion, the second fixed end for the fixed portion, and the first sidewall have plate-shaped structures. The first fixed end for the movable portion is located between the movable portion and the first sidewall.

According to some embodiments of the present disclosure, the tactile feedback mechanism further includes a damping component. The movable portion is movably connected to the fixed portion via the damping component. The damping component is flexible, and the damping component has a plastic material, the elastic coefficient of the damping component is lower than the elastic coefficient of the first elastic portion.

According to some embodiments of the present disclosure, the movable portion includes a second stopper portion for limiting the range of movement of the movable portion relative to the fixed portion. When the movable portion is in a second limiting position, the second stopper portion directly or indirectly contacts the second sidewall of the fixed portion.

According to some embodiments of the present disclosure, the tactile feedback mechanism further includes a second buffer component, the second buffer component has a plastic material. The second buffer component is fixedly disposed on the second stopper portion or the second sidewall.

According to some embodiments of the present disclosure, when the first fixed end for the movable portion directly or indirectly contacts both the first fixed end for the fixed portion and the second fixed end for the fixed portion, the range of movement of the movable portion relative to the fixed portion is limited.

According to some embodiments of the present disclosure, the tactile feedback mechanism further includes a first buffer component. The first buffer component has a plastic material. The first buffer component is fixedly disposed on the first fixed end for the movable portion or both the first fixed end for the fixed portion and the second fixed end for the fixed portion.

According to some embodiments of the present disclosure, when viewed along the direction of the main axis, the first elastic portion and the second elastic portion have a pointed shape. The first elastic portion and the second elastic portion are mirror-symmetrical with each other relative to the movable portion.

According to some embodiments of the present disclosure, the connecting assembly further includes an adjusting component. The adjusting component has a plate-like structure, and is disposed on the first elastic portion for adjusting the elastic coefficient of the first elastic portion. The Young's modulus of the adjusting component is greater than the Young's modulus of the first elastic portion. The first elastic portion and the adjusting component have different metal materials.

According to some embodiments of the present disclosure, the first elastic portion includes a first opening and a second opening. The movable portion further includes a third stopper portion passes through the first opening and the second opening respectively. The first opening and the second opening have independent structures. When the movable portion is in a third limiting position, the third stopper portion directly or indirectly contacts the third sidewall of the fixed portion.

According to some embodiments of the present disclosure, the tactile feedback mechanism further includes a third buffer component. The third buffer component is fixedly disposed on the third stopper portion or the third sidewall of the fixed portion. The third buffer component has a plastic material.

According to some embodiments of the present disclosure, the driving assembly includes a coil, a magnetic assembly, and a magnetic permeability component. The magnetic assembly corresponds to the coil. The magnetic permeability component is fixedly disposed on the magnetic assembly and has a magnetic permeability material. The magnetic permeability component is used to adjust the distribution of the magnetic field generated by the magnetic assembly. The coil and the magnetic assembly are arranged along the direction of the main axis. The movable portion and the coil are at least partially overlapped when viewed along a direction perpendicular to the direction of the main axis.

According to some embodiments of the present disclosure, the magnetic assembly further includes a first magnetic component, a second magnetic component, and a third magnetic component. The second magnetic component and the third magnetic component correspond to the first magnetic component. The first magnetic component, the second magnetic component, and the third magnetic component are arranged along a first axis. The first magnetic component has a first magnetic pole pair including an N pole and an S pole. The second magnetic component has a second magnetic pole pair including an N pole and an S pole. The third magnetic component has a third magnetic pole pair including an N pole and an S pole. The first magnetic pole pair, the second magnetic pole pair, and the third magnetic pole pair are arranged in different orientations respectively. The magnetic pole pairs of the second magnetic pole pair and the third magnetic pole pair are arranged along the first axis. The N pole of the second magnetic pole pair is closer to the first magnetic component than the S pole of the second magnetic pole pair. The N pole of the third magnetic pole pair is closer to the first magnetic component than the S pole of the third magnetic pole pair. The S pole of the first magnetic pole pair is closer to the magnetic permeability component than the N pole of the first magnetic pole pair. The N pole of the first magnetic pole pair is closer to the coil than the S pole of the first magnetic pole pair.

BRIEF DESCRIPTION OF THE DRAWINGS

In order to make the above and other objectives, features, and advantages of the present disclosure more obvious and understandable, preferred embodiments are listed below in conjunction with the accompanying drawings, which are described in detail as follows.

DETAILED DESCRIPTION OF THE INVENTION

Figure 1:
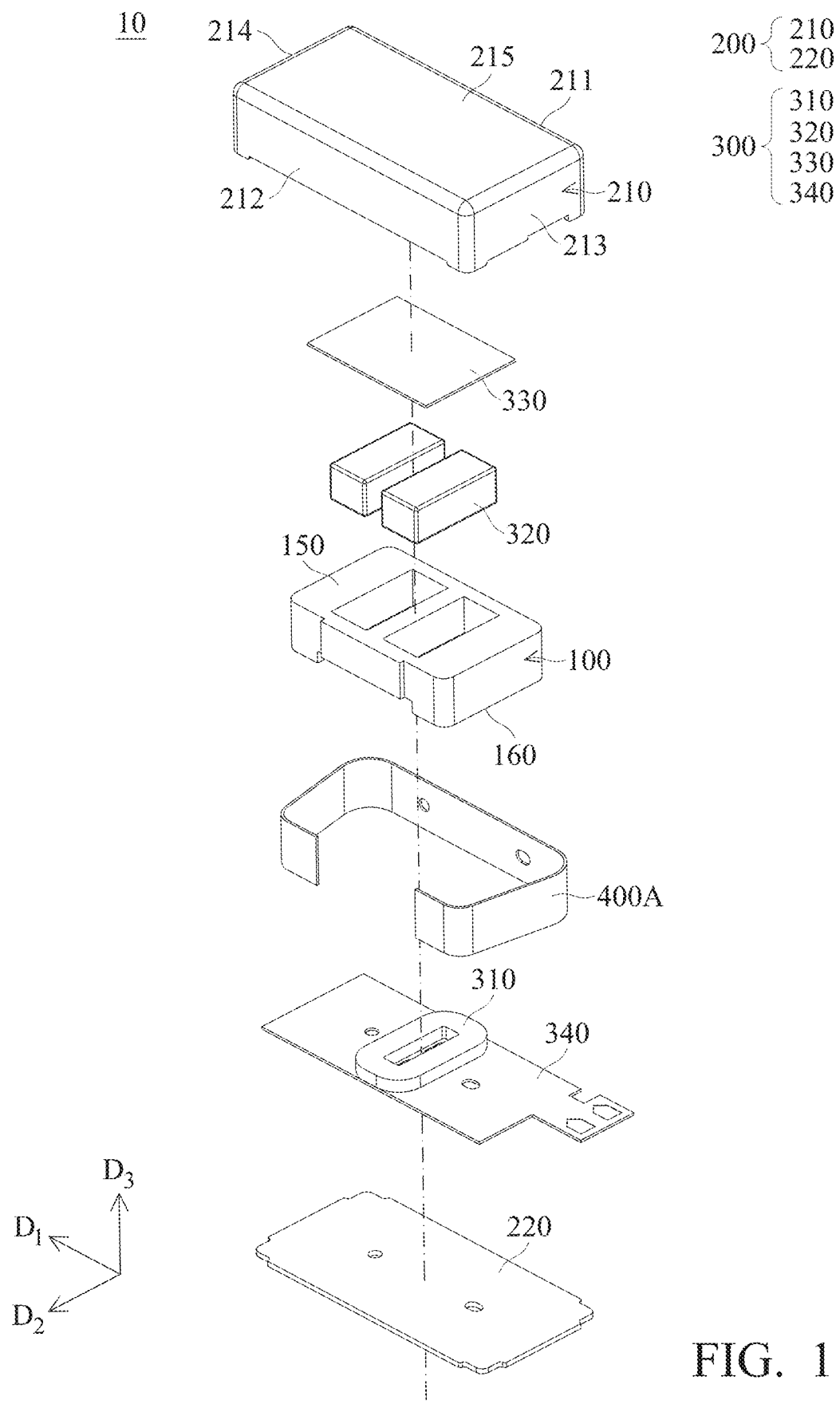
FIG. 1 is an exploded view of the tactile feedback mechanism according to some embodiments of the disclosure.

In order to make the purpose, features, and advantages of the present disclosure more obvious and understandable, the following embodiments are specially cited, and the accompanying drawings are used for detailed description. The exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding components in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In addition, relative terms such as "lower" or "bottom" and "upper" or "top" may be used in the embodiments to describe the relative relationship between one component and another component of the illustration. It should be understood that if the illustrated device is turned upside down, the components described on the "lower" side will become the components on the "upper" side.

The making and using of the embodiments of the tactile feedback mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure. Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Referring to FIG. 1, which is an exploded view of the tactile feedback mechanism 10 according to some embodiments of the present disclosure. As shown in FIG. 1, the tactile feedback mechanism 10 includes a movable portion 100, a fixed portion 200, a driving assembly 300, and a connecting assembly 400A. The fixed portion 200 includes a housing 210 and a base 220. The driving assembly 300 includes a coil 310, a set of magnetic assembly 320, a magnetic permeability component 330, and a printed circuit board 340.

The movable portion 100 has an upper portion 150 and a lower portion 160. The upper portion 150 of the movable portion 100 can be seen in FIG. 1, and the lower portion 160 of the movable portion 100 cannot be seen in the perspective of FIG. 1. The housing 210 of the fixed portion 200 has a top surface 215, a first sidewall 211, a second sidewall 212, a third sidewall 213, and a fourth sidewall 214. The top surface 215, the second sidewall 212, and the third sidewall 213 of the housing 210 can be seen in FIG. 1.

The housing 210 and the base 220 of the fixed portion 200 can be combined to form a space for accommodating the parts inside the fixed portion 200. The driving assembly 300 can drive the movable portion 100 to vibrate in the direction of a first axis D1 relative to the fixed portion 200. The connecting assembly 400A is flexible. The movable portion 100 is movably connected to the fixed portion 200 via the connecting assembly 400A.

The magnetic assembly 320 of the driving assembly 300 corresponds to the coil 310. The magnetic permeability component 330 is fixedly disposed on the magnetic assembly 320 and has a magnetic permeability material. The magnetic permeability component 330 is used to adjust the distribution of the magnetic field generated by the magnetic assembly 320. The coil 310 and the magnetic assembly 320 are arranged along the direction of a main axis D3. When viewed along a direction perpendicular to the main axis D3 (for example, the first axis D1 or a second axis D2), the movable portion 100 and the coil 310 at least partially overlap. This arrangement may reduce the thickness of the tactile feedback mechanism 10 in the direction of the main axis D3, to achieve the effect of miniaturization.

Figure 2A:
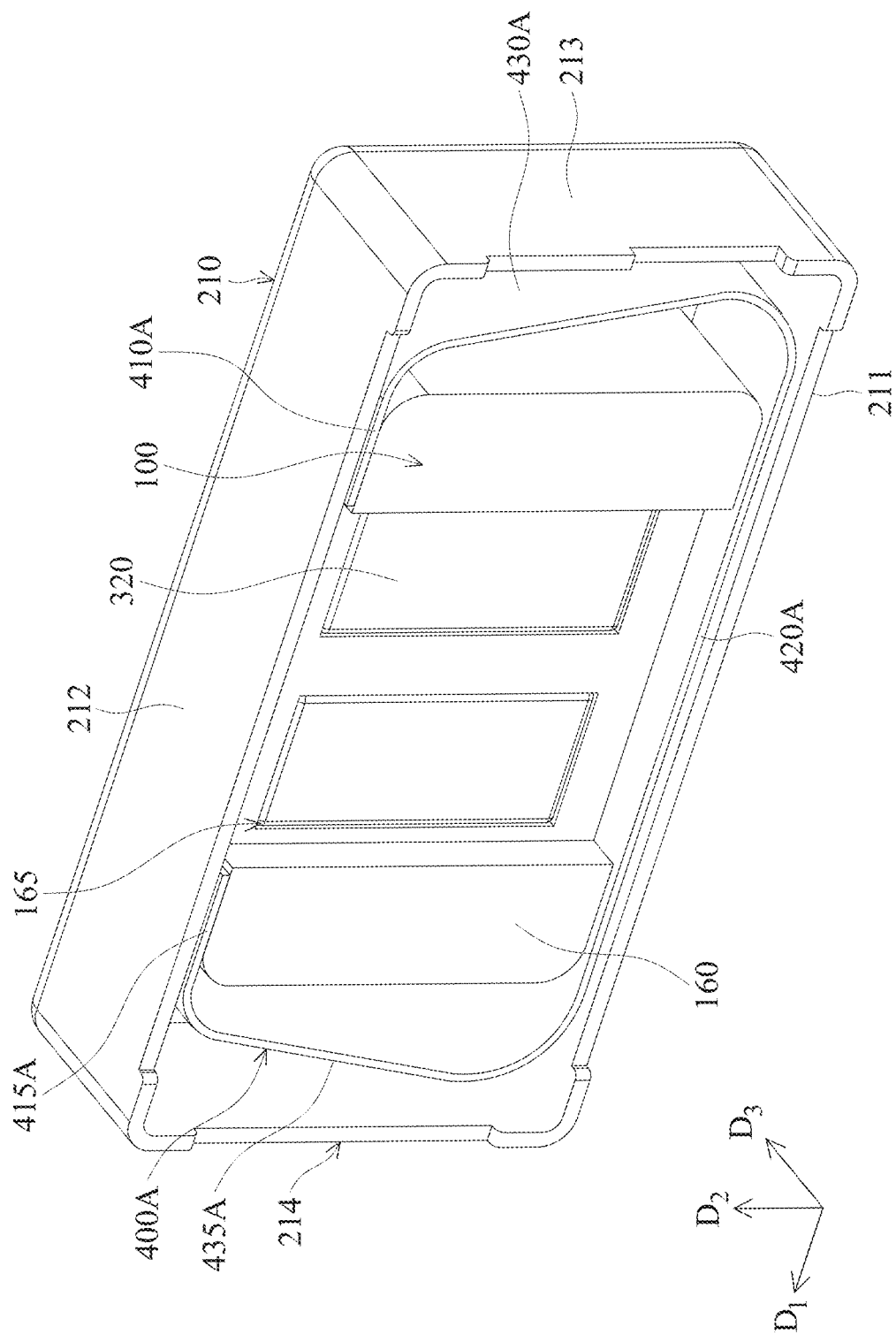
FIG. 2A is a perspective view of a portion of the tactile feedback mechanism according to some embodiments of the present disclosure, showing the movable portion, the housing, the connecting assembly, and the magnetic assembly.

FIG. 2A shows a perspective view of a portion of the tactile feedback mechanism 10 according to some embodiments of the present disclosure. The lower portion 160 of the movable portion 100, the second sidewall 212 and the third sidewall 213 of the housing 210, the magnetic assembly 320, and the connecting assembly 400A can be seen. The lower portion 160 of the movable portion 100 also includes a recess portion 165 that may accommodate the coil 310 (FIG. 1) upon assemble.

Figure 2B:
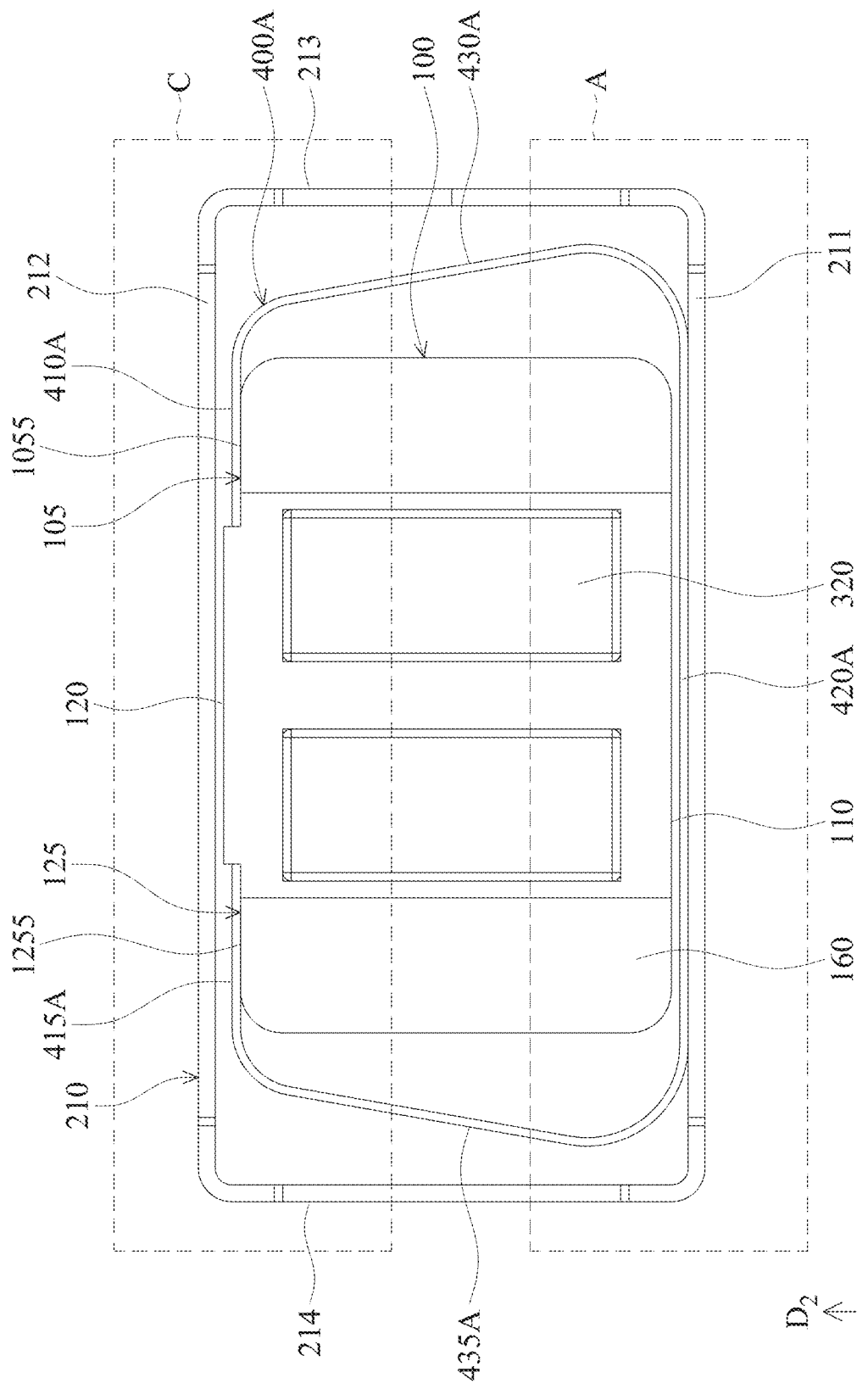
FIG. 2B is a front view of the portion of the tactile feedback mechanism of FIG. 2A according to some embodiments of the disclosure, showing the movable portion, the housing, the connecting assembly, and the magnetic assembly.

FIG. 2B is a front view of the portion of the tactile feedback mechanism 10 shown in FIG. 2A in the initial position. The lower portion 160 of the movable portion 100, the first sidewall 211, the second sidewall 212, the third sidewall 213, and the fourth sidewall 214 of the housing 210 can be seen. The magnetic assembly 320 and the connecting assembly 400A can also be seen.

In the embodiment shown in FIG. 2B, the connecting assembly 400A has a first fixed end for the movable portion 410A, a second fixed end for the movable portion 415A, a first fixed end for the fixed portion 420A, a first elastic portion 430A, and a second elastic portion 435A. The first fixed end for the movable portion 410A and the second fixed end for the movable portion 415A are fixedly connected to the movable portion 100. The first fixed end for the fixed portion 420A is fixedly connected to the first sidewall 211 of the housing 210.

The movable portion 100 and the connecting assembly 400A are made of different metal materials. The density of the metal material of the connecting assembly 400A is lower than the density of the metal material of the movable portion 100. For example, the connecting assembly 400A may be made of copper alloy, and the movable portion 100 may be made of tungsten. This configuration may increase the vibration intensity of the movable portion 100, thereby improving the performance of the tactile feedback mechanism 10.

The first fixed end for the movable portion 410A, the second fixed end for the movable portion 415A, and the first fixed end for the fixed portion 420A are formed in one piece. The first fixed end for the movable portion 410A is connected to the first fixed end for the fixed portion 420A via the first elastic portion 430A. The second fixed end for the movable portion 415A is connected to the first fixed end for the fixed portion 420A via the second elastic portion 435A. Both the first elastic portion 430A and the second elastic portion 435A are flexible.

The first fixed end for the movable portion 410A and the second fixed end for the movable portion 415A are arranged along the direction of the first axis D1 and are parallel to each other. This arrangement makes the laser welding process during assembly easier to perform.

The movable portion 100 includes a first connecting portion 105, a second connecting portion 125, a first stopper portion 110, and a second stopper portion 120. The first connecting portion 105 includes a first connecting surface 1055, and the second connecting portion 125 includes a second connecting surface 1255. Both the first connecting surface 1055 and the second connecting surface 1255 face the second sidewall 212 of the housing 210.

It should be noted that in the initial position, the first stopper portion 110 of the movable portion 100 does not contact the first fixed end for the fixed portion 420A, and the second stopper portion 120 of the movable portion 100 does not contact the second sidewall 212 of the housing 210.

The first connecting portion 105 and the second connecting portion 125 both have a recessed structure relative to the second stopper portion 120. In other words, relative to the protruding structure of the second stopper portion 120, the first connecting portion 105 and the second connecting portion 125 are in a recessed portion, and wherein the first fixed end for the movable portion 410A is fixed to the first connecting surface 1055 of the first connecting portion 105, the second fixed end for the movable portion 415A is fixed to the second connecting surface 1255 of the second connecting portion 125. This configuration enables the tactile feedback mechanism 10 of the present disclosure to achieve miniaturization.

The first stopper portion 110 of the movable portion 100 is located close to the first sidewall 211 of the housing 210. The second stopper portion 120 of the movable portion 100 is located close to the second sidewall 212 of the housing 210. FIGS. 3A to 3D show the partial front views of the two frames A and C in FIG. 2B, with the first stopper portion 110 in the first limiting position and the second stopper portion 120 in the second limiting position respectively.

Figure 3A:
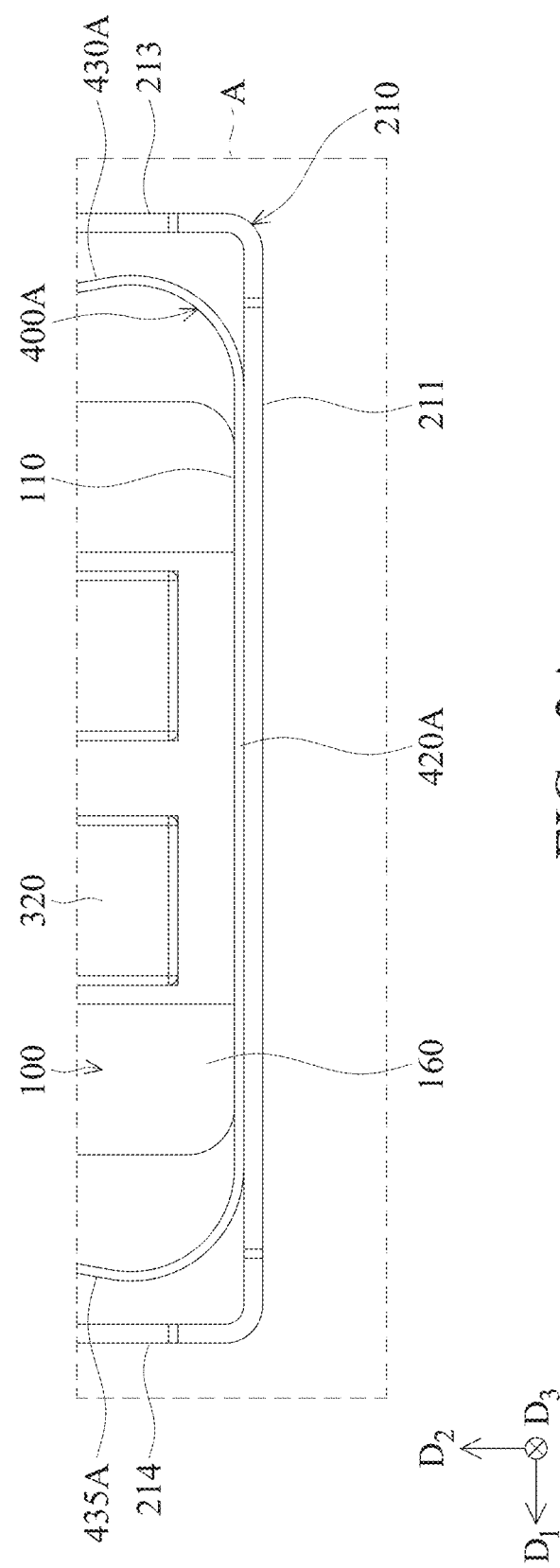
FIG. 3A is a partial front view showing the tactile feedback mechanism in the first limiting position according to some embodiments of the present disclosure.
Figure 3B:
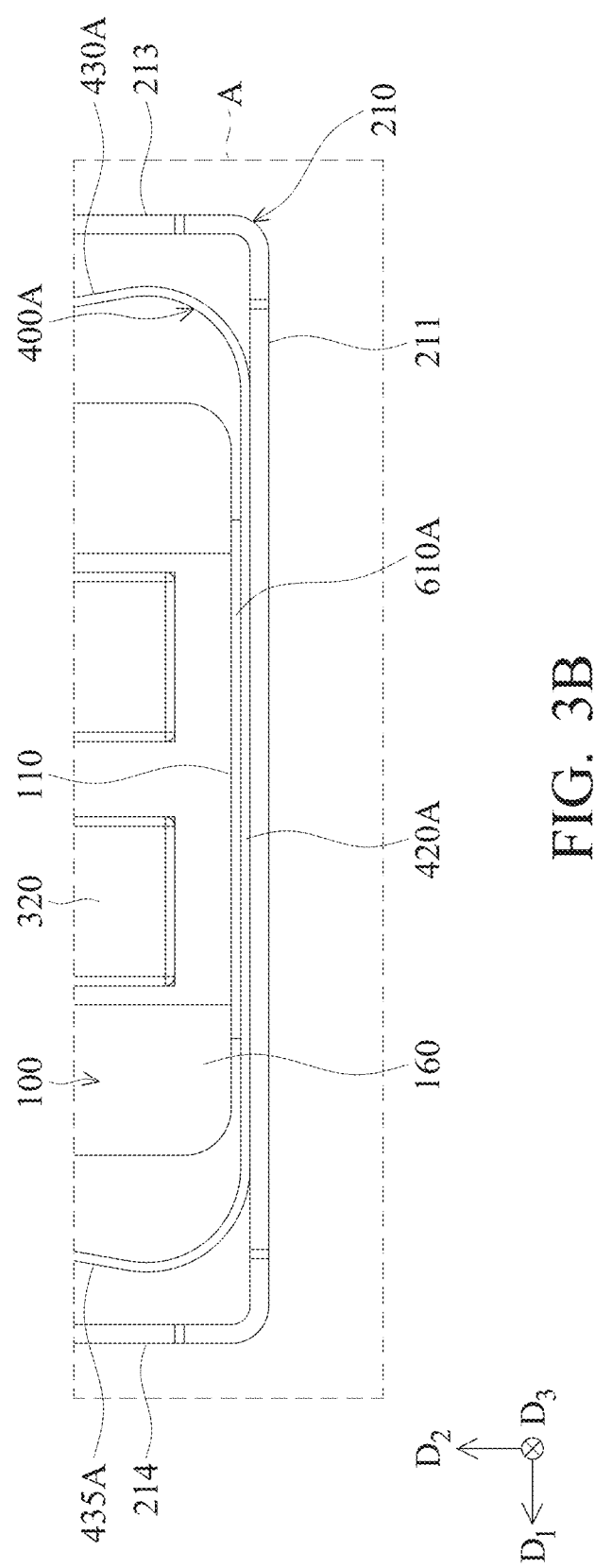
FIG. 3B is another partial front view of the tactile feedback mechanism in the first limiting position according to some embodiments of the present disclosure, including the first buffer component.

According to some embodiments of the present disclosure, FIGS. 3A and 3B show partial front views of the movable portion 100 in the frame A of FIG. 2B in the first limiting position. When the movable portion 100 is in the first limiting position, the first stopper portion 110 limits the range of movement of the movable portion 100 relative to the fixed portion 200 (FIG. 1). As shown in FIGS. 3A and 3B, in the first limiting position, the first stopper portion 110 can directly or indirectly contact the first fixed end for the fixed portion 420A.

In the embodiment shown in FIG. 3A, the movable portion 100 directly contacts the first fixed end for the fixed portion 420A in the first limiting position. In the embodiment shown in FIG. 3B, the tactile feedback mechanism 10 further includes a first buffer component 610A. The first buffer component 610A is made of a plastic material, and may be arranged on the first stopper portion 110 or the first fixed end for the fixed portion 420A. When the movable portion 100 is in the first limiting position, the first stopper portion 110 indirectly contacts the first fixed end for the fixed portion 420A via the first buffer component 610A, so that the movable portion 100 will not be damaged in the first limiting position.

Figure 3C:
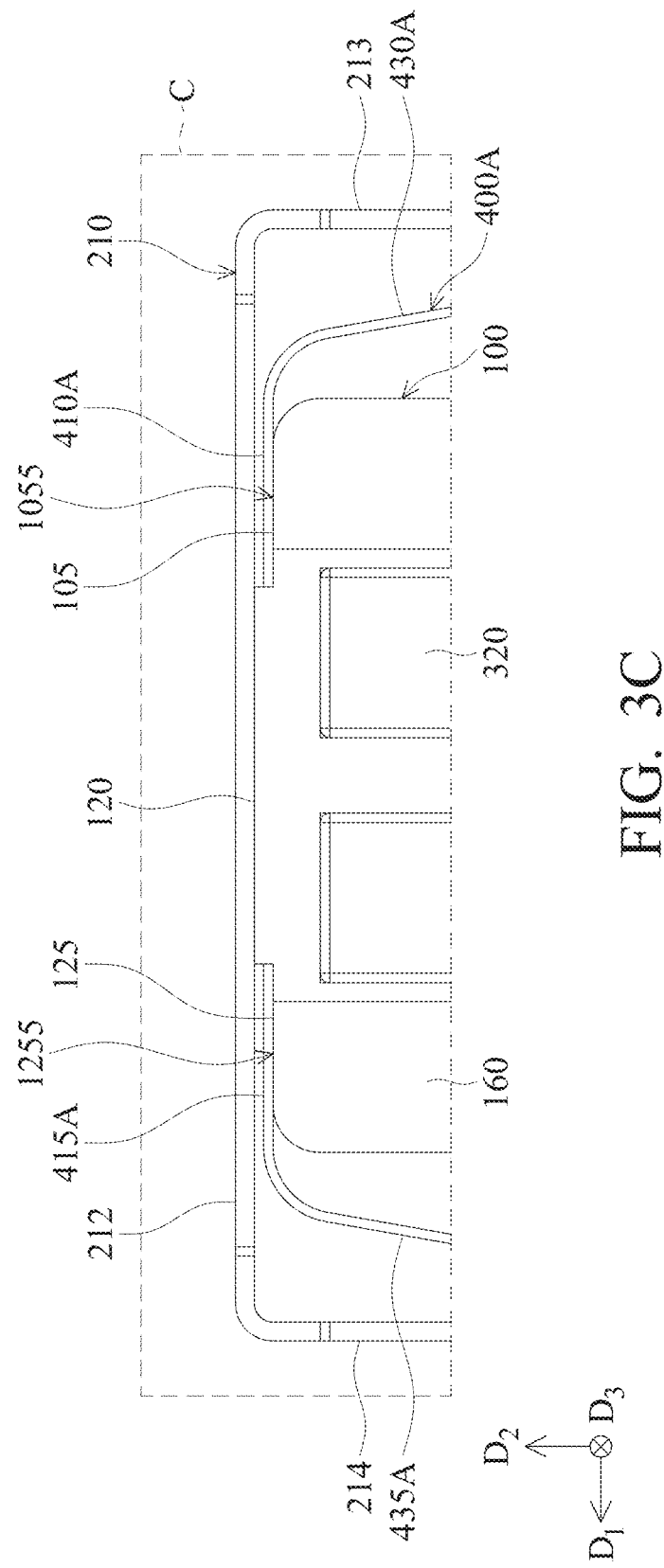
FIG. 3C is a partial front view of the tactile feedback mechanism in the second limiting position according to some embodiments of the present disclosure.
Figure 3D:
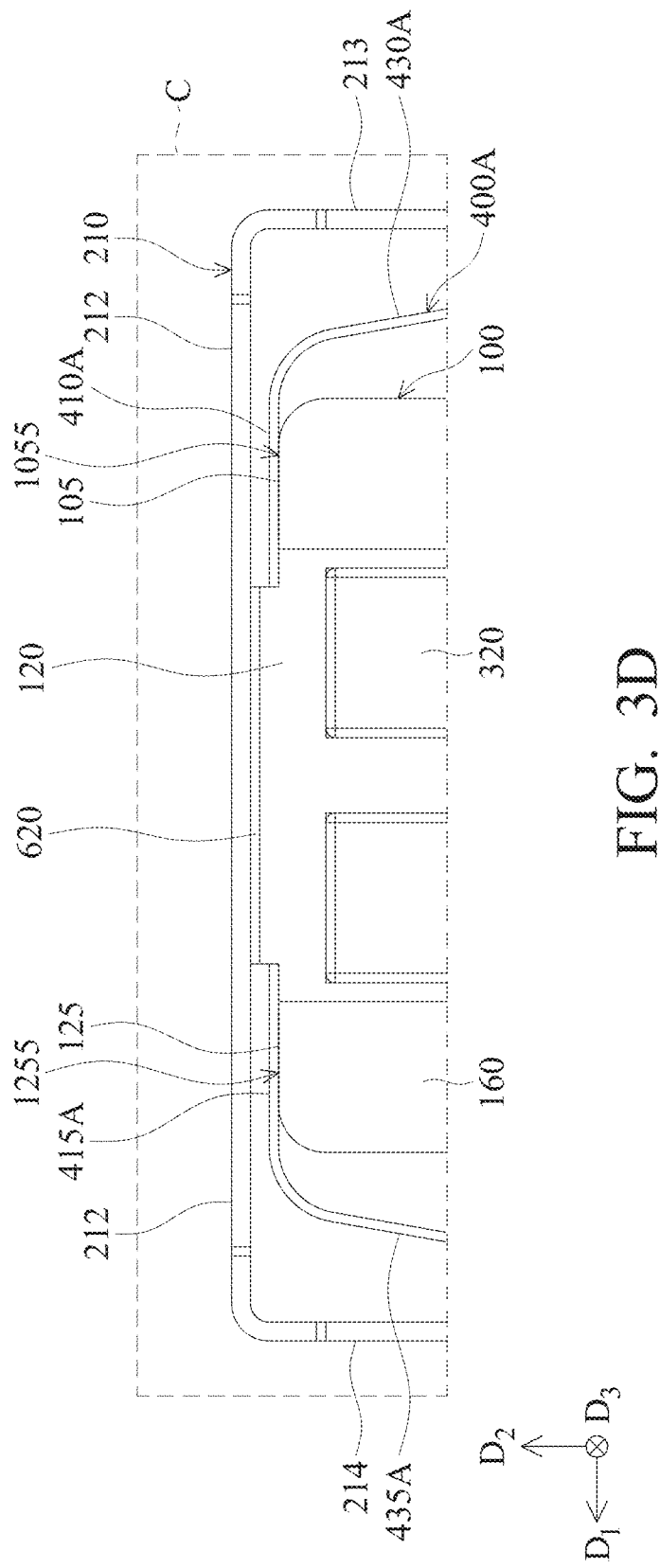
FIG. 3D is another partial front view of the tactile feedback mechanism in the second limiting position according to some embodiments of the present disclosure, including the second buffer component.

FIGS. 3C and 3D show partial front views of the movable portion 100 in the frame C of FIG. 2B in the second limiting position. In the embodiment shown in FIG. 3C, the second stopper portion 120 is located between the first connecting portion 105 and the second connecting portion 125 when viewed along the direction of the main axis D3.

Referring to FIG. 3C, when the movable portion 100 is in the second limiting position, the second stopper portion 120 limits the range of movement of the movable portion 100 relative to the fixed portion 200 (FIG. 1). As shown in FIGS. 3C and 3D, the second stopper portion 120 can directly or indirectly contact the second sidewall 212 of the housing 210 in the second limiting position.

In the embodiment shown in FIG. 3C, the second stopper portion 120 of the movable portion 100 directly contacts the second sidewall 212 of the housing 210 in the second limiting position. In the embodiment shown in FIG. 3D, the tactile feedback mechanism 10 further includes a second buffer component 620. The second buffer component 620 is made of plastic material, and may be disposed on the second stopper portion 120 or the second sidewall 212 of the housing 210. When the movable portion 100 is in the second limiting position, the second stopper portion 120 indirectly contacts the second sidewall 212 of the housing 210 via the second buffer component 620.

Figure 4A:
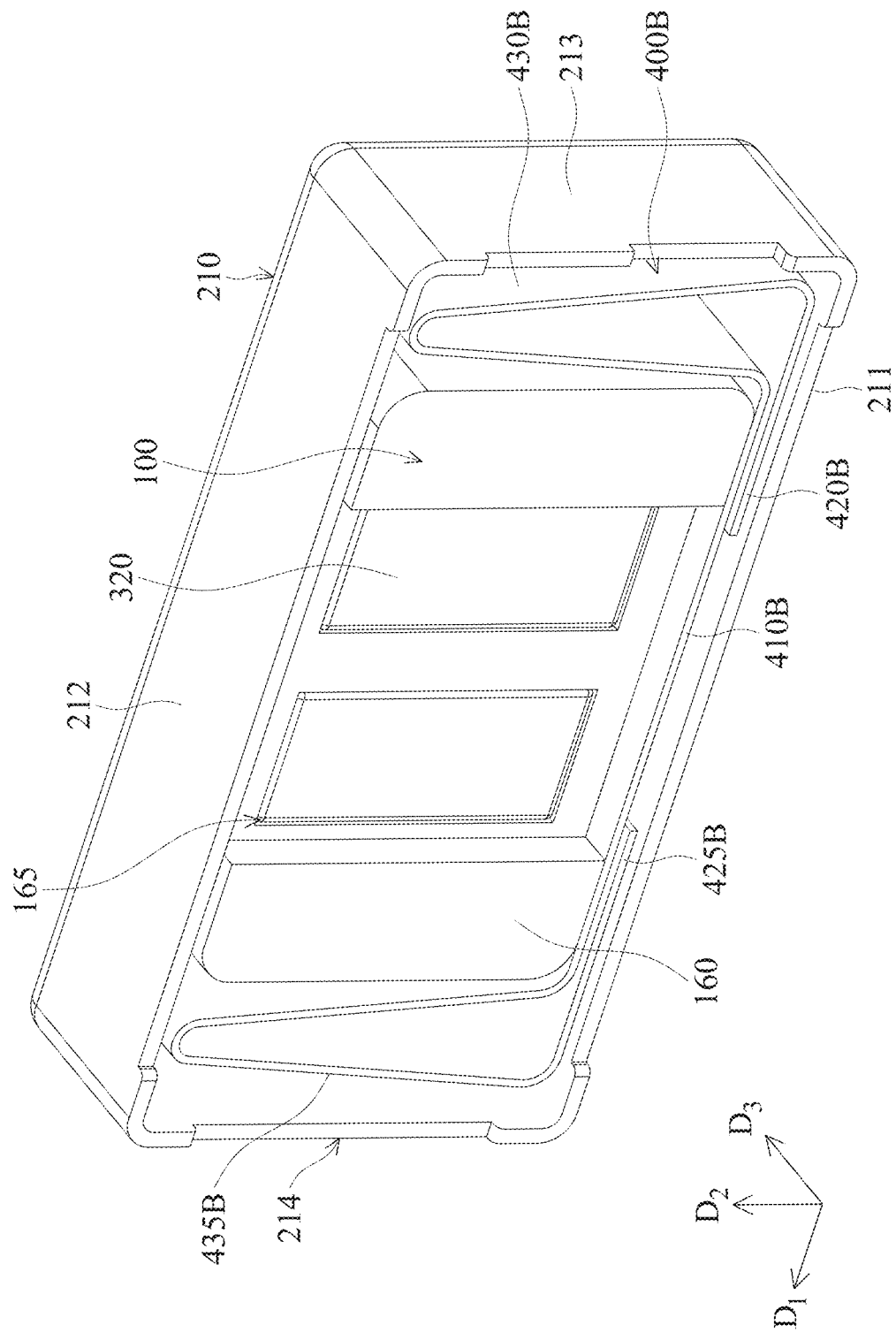
FIG. 4A is another perspective view of a portion of the tactile feedback mechanism according to some embodiments of the present disclosure, showing the movable portion, the housing, the connecting assembly, and the magnetic assembly.

FIG. 4A shows a perspective view of a portion of the tactile feedback mechanism 10 according to another embodiment of the present disclosure. In FIG. 4A, the lower portion 160 of the movable portion 100, the housing 210, the magnetic assembly 320, and a connecting assembly 400B can be seen. The tactile feedback mechanism 10 of FIG. 4A is substantially similar to the tactile feedback mechanism 10 of FIG. 2A, and the connecting assembly 400B is similar to the connecting assembly 400A described above, and has common features and functions, the details of which will be describe below.

Figure 4B:
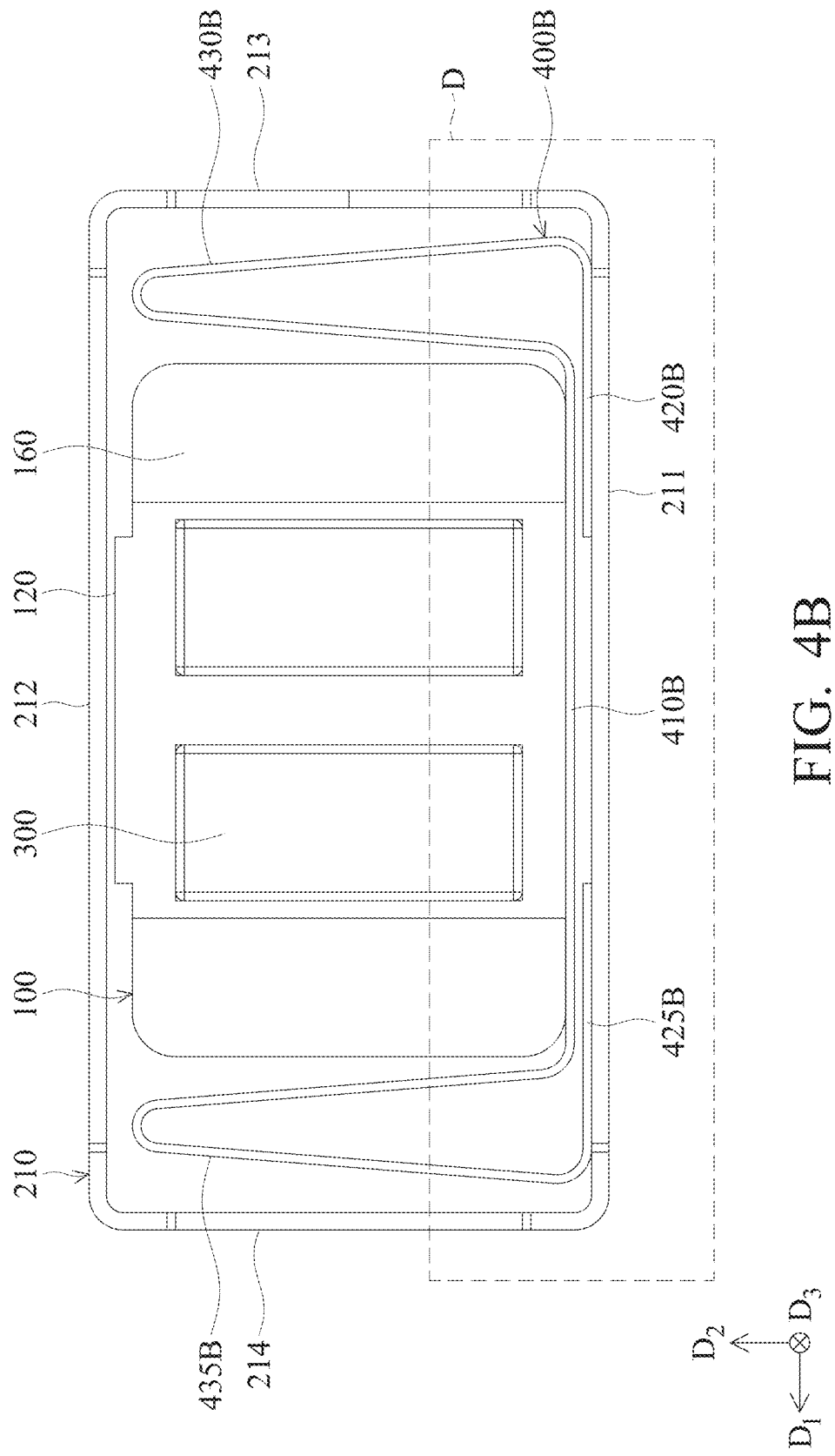
FIG. 4B is a front view of the portion of the tactile feedback mechanism of FIG. 4A according to some embodiments of the disclosure, showing the movable portion, the housing, the connecting assembly, and the magnetic assembly.

FIG. 4B is a front view of the portion of the tactile feedback mechanism 10 shown in FIG. 4A. The lower portion 160 of the movable portion 100, the first sidewall 211, the second sidewall 212, the third sidewall 213, and the fourth sidewall 214 of the housing 210 can be seen. The magnetic assembly 320 and the connecting assembly 400B can also be seen. The driving assembly 300 (FIG. 1) can drive the movable portion 100 to move relative to the fixed portion 200 (FIG. 1) in the direction of the first axis D1. The movable portion 100 is movably connected to the fixed portion 200 (FIG. 1) via the connecting assembly 400B, wherein the connecting assembly 400B is made of a metal material.

In the embodiment shown in FIG. 4B, the connecting assembly 400B has a first fixed end for the movable portion 410B, a first fixed end for the fixed portion 420B, a second fixed end for the fixed portion 425B, a first elastic portion 430B, and a second elastic portion 435B. The first fixed end for the movable portion 410B is fixedly connected to the movable portion 100. The first fixed end for the fixed portion 420B and the second fixed end for the fixed portion 425B are fixedly connected to the first sidewall 211 of the fixed portion 200.

As shown in FIG. 4B, the first fixed end for the movable portion 410B is fixedly connected to the movable portion 100. The first fixed end for the fixed portion 420B and the second fixed end for the fixed portion 425B are fixedly connected to the first sidewall 211 of the housing 210. The first fixed end for the movable portion 410B is connected to the first fixed end for the fixed portion 420B via the first elastic portion 430B. The first fixed end for the movable portion 410B is connected to the second fixed end for the fixed portion 425B via the second elastic portion 435B. The first elastic portion 430B and the second elastic portion 435B are similar to the first elastic portion 430A and the second elastic portion 435A shown in FIG. 2B, and are both flexible.

Continuing to refer to FIG. 4B, the first fixed end for the movable portion 410B, the first fixed end for the fixed portion 420B, and the second fixed end for the fixed portion 425B are formed in one piece. The first fixed end for the fixed portion 420B and the second fixed end for the fixed portion 425B are arranged along the direction of the first axis D1.

The first fixed end for the fixed portion 420B and the second fixed end for the fixed portion 425B are disposed on the first sidewall 211 of the housing 210. The first fixed end for the movable portion 410B, the first fixed end for the fixed portion 420B, and the second fixed end for the fixed portion 425B have a plate-shaped structure. The first fixed end for the movable portion 410B is located between the movable portion 100 and the first sidewall 211.

When viewed along the direction of the main axis D3, the first elastic portion 430B and the second elastic portion 435B each have a pointed shape, and the first elastic portion 430B and the second elastic portion 435B are mirror-symmetrical with each other relative to the movable portion 100. This design of folding the connecting assembly 400B in the limited accommodating space of the tactile feedback mechanism 10 enables the connecting assembly 400B in this embodiment to have a smaller elastic coefficient, so that the vibration intensity of the tactile feedback mechanism 10 may increase, thereby increasing the performance of the tactile feedback mechanism 10.

In the second limiting position, the second stopper portion 120 of the embodiment shown in FIG. 4B operates in the same manner as the second stopper portion 120 in FIGS. 3C and 3D. That is to say, when the movable portion 100 in FIG. 4B is in the second limiting position as shown in FIGS. 3C and 3D, the second stopper portion 120 can directly contact the second sidewall 212 as shown in FIG. 3C, or indirectly contact the second sidewall 212 via the second buffer component 620 provided on the second stopper portion 120 or the second sidewall 212 as shown in FIG. 3D, to limit the movement range of the movable portion 100.

Figure 5A:
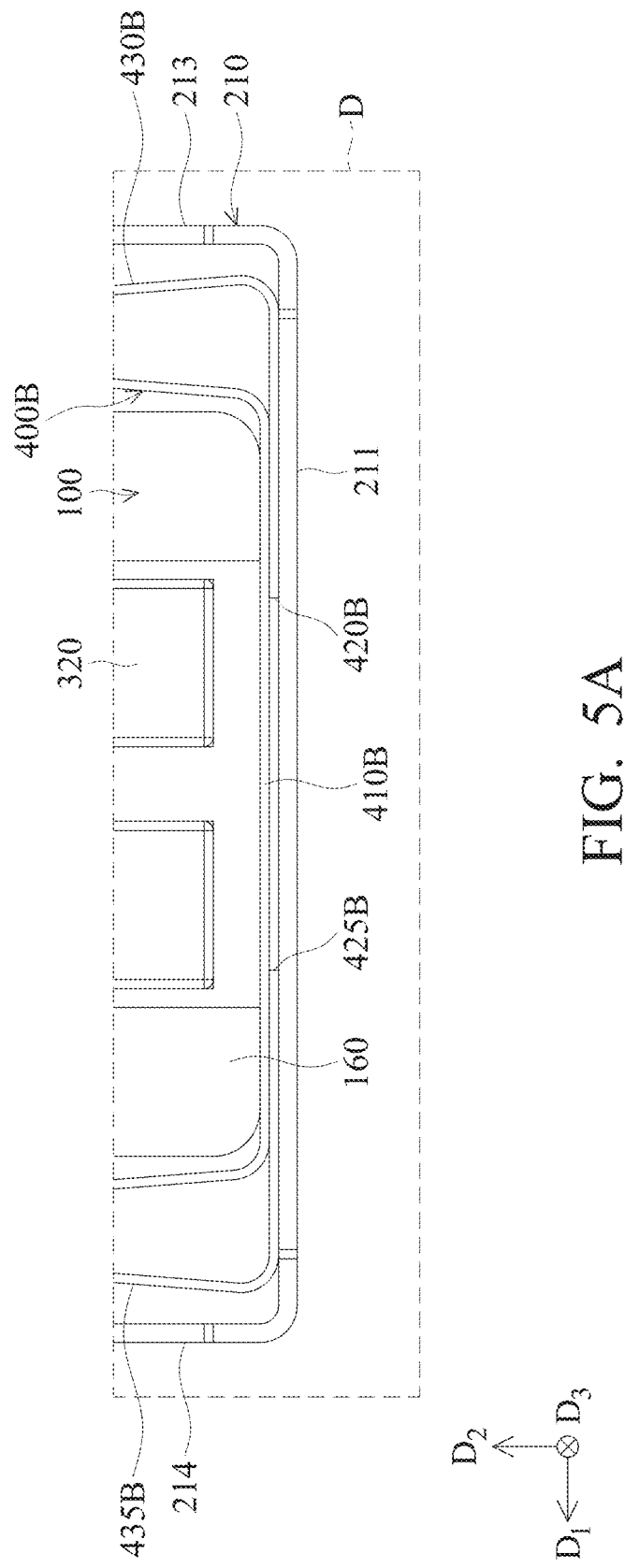
FIG. 5A is another partial front view of the tactile feedback mechanism in the first limiting position according to some embodiments of the present disclosure.
Figure 5B:
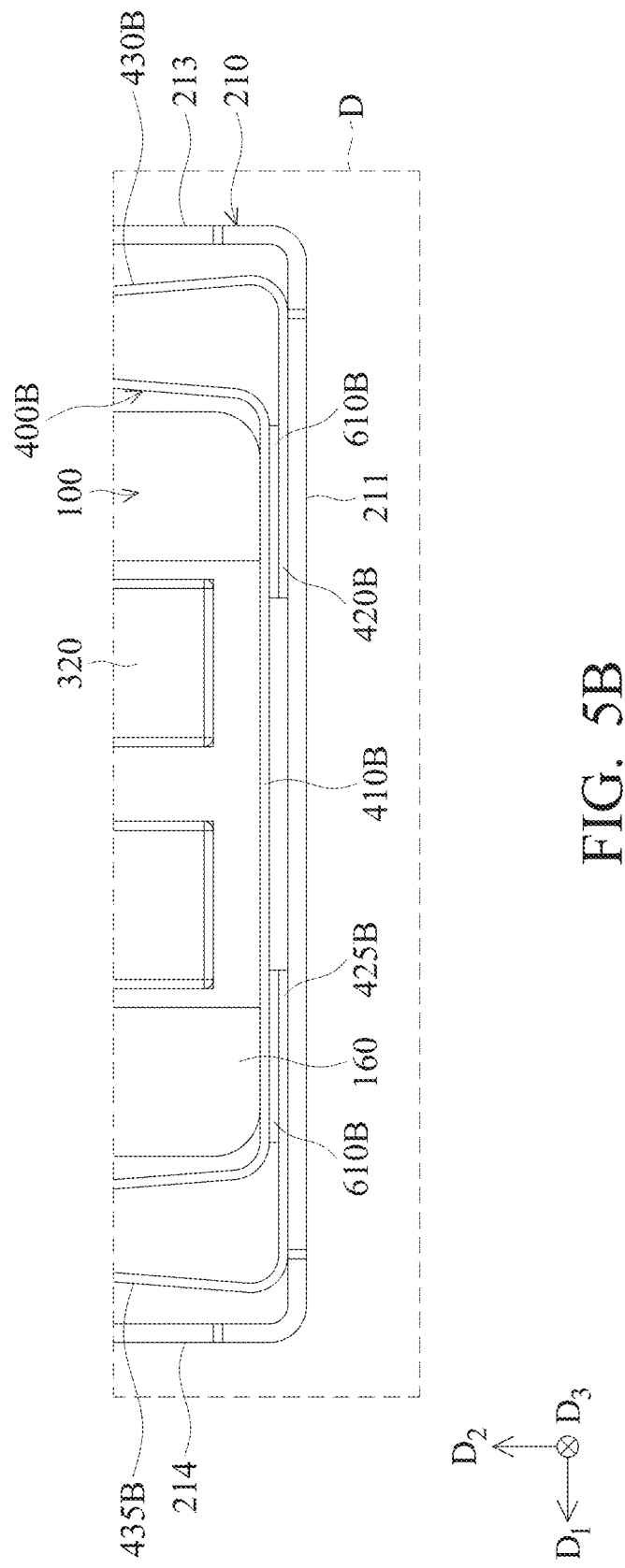
FIG. 5B is another partial front view of the tactile feedback mechanism in the first limiting position according to some embodiments of the present disclosure, including another first buffer component.

According to some embodiments of the present disclosure, FIGS. 5A and 5B show partial front views of the movable portion 100 in the frame D in FIG. 4B in the first limiting position. When the movable portion 100 is in the first limiting position, the first fixed end for the movable portion 410B limits the range of movement of the movable portion 100 relative to the fixed portion 200 (FIG. 1). As shown in FIGS. 5A and 5B, in the first limiting position, the first fixed end for the movable portion 410B may directly or indirectly contact the first fixed end for the fixed portion 420B and the second fixed end for the fixed portion 425B.

In the embodiment shown in FIG. 5A, the first fixed end for the movable portion 410B directly contacts the first fixed end for the fixed portion 420B and the second fixed end for the fixed portion 425B in the first limiting position. In the embodiment shown in FIG. 5B, the tactile feedback mechanism 10 further includes a first buffer component 610B. The first buffer component 610B is made of plastic material, and may be disposed on the first fixed end for the movable portion 410B or both the first fixed end for the fixed portion 420B and the second fixed end for the fixed portion 425B. When the movable portion 100 is in the first limiting position, the first fixed end for the movable portion 410B indirectly contacts the first fixed end for the fixed portion 420B and the second fixed end for the fixed portion 425B via the first buffer component 610B.

Figure 6A:
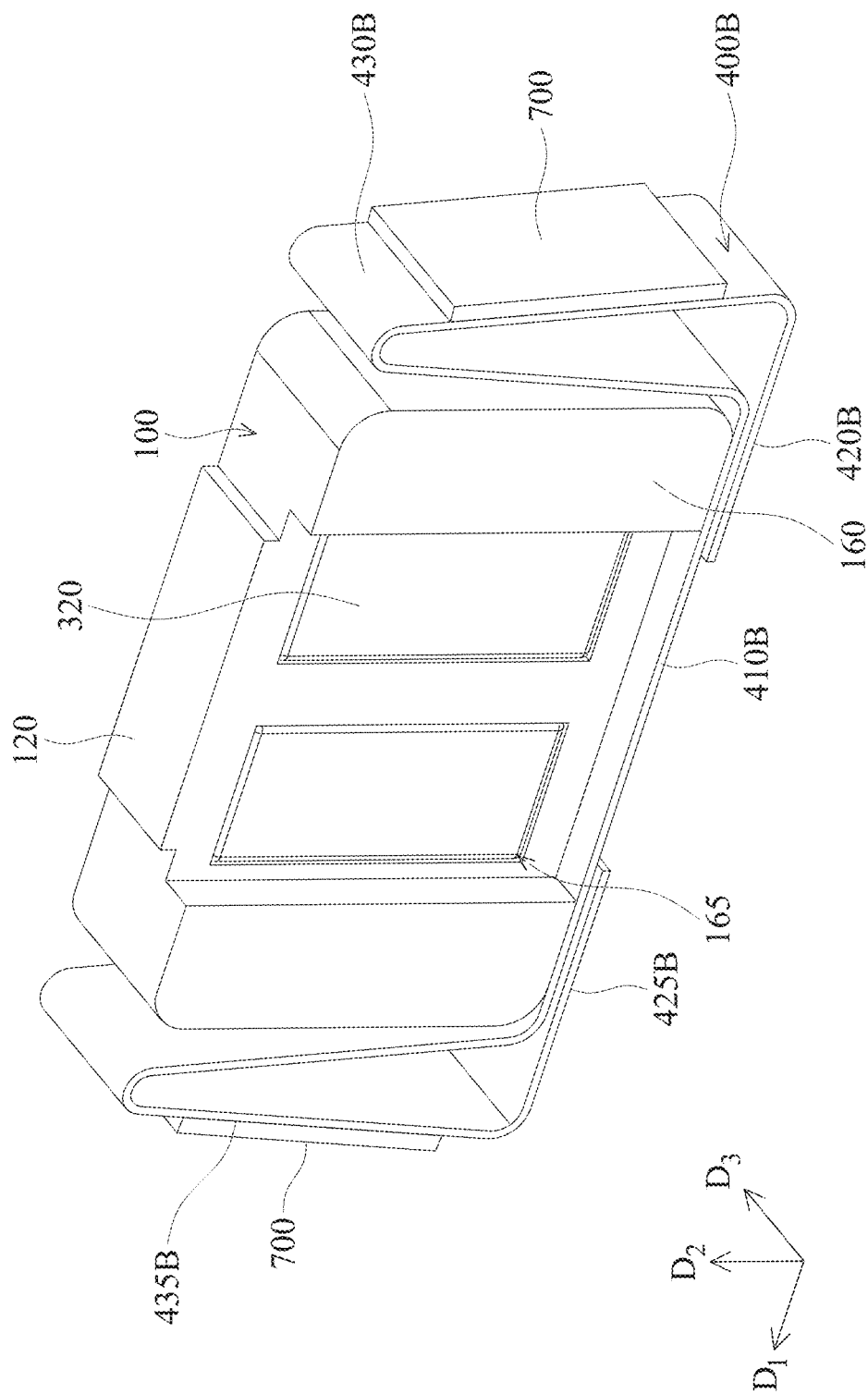
FIG. 6A is a perspective view of a portion of the tactile feedback mechanism according to some embodiments of the present disclosure, showing the movable portion, the connecting assembly, the magnetic assembly, and the adjusting component.

According to some embodiments of the present disclosure, FIG. 6A shows a perspective view of the movable portion 100, the magnetic assembly 320, the connecting assembly 400B, and an adjusting component 700 of the tactile feedback mechanism 10. In the embodiment shown in FIG. 6A, the adjusting component 700 is disposed on the first elastic portion 430B and the second elastic portion 435B of the connecting assembly 400B.

As shown in FIG. 6A, the adjusting component 700 has a plate-like structure. The Young's modulus of the adjusting component 700 is greater than the Young's modulus of the first elastic portion 430B and the second elastic portion 435B. The adjusting component 700 may be used to adjust the elastic coefficients of the first elastic portion 430B and the second elastic portion 435B, to change the vibration intensity and vibration frequency of the tactile feedback mechanism 10. The adjusting component 700 and the connecting assembly 400B are made of different metal materials, for example, different copper alloys.

Figure 6B:
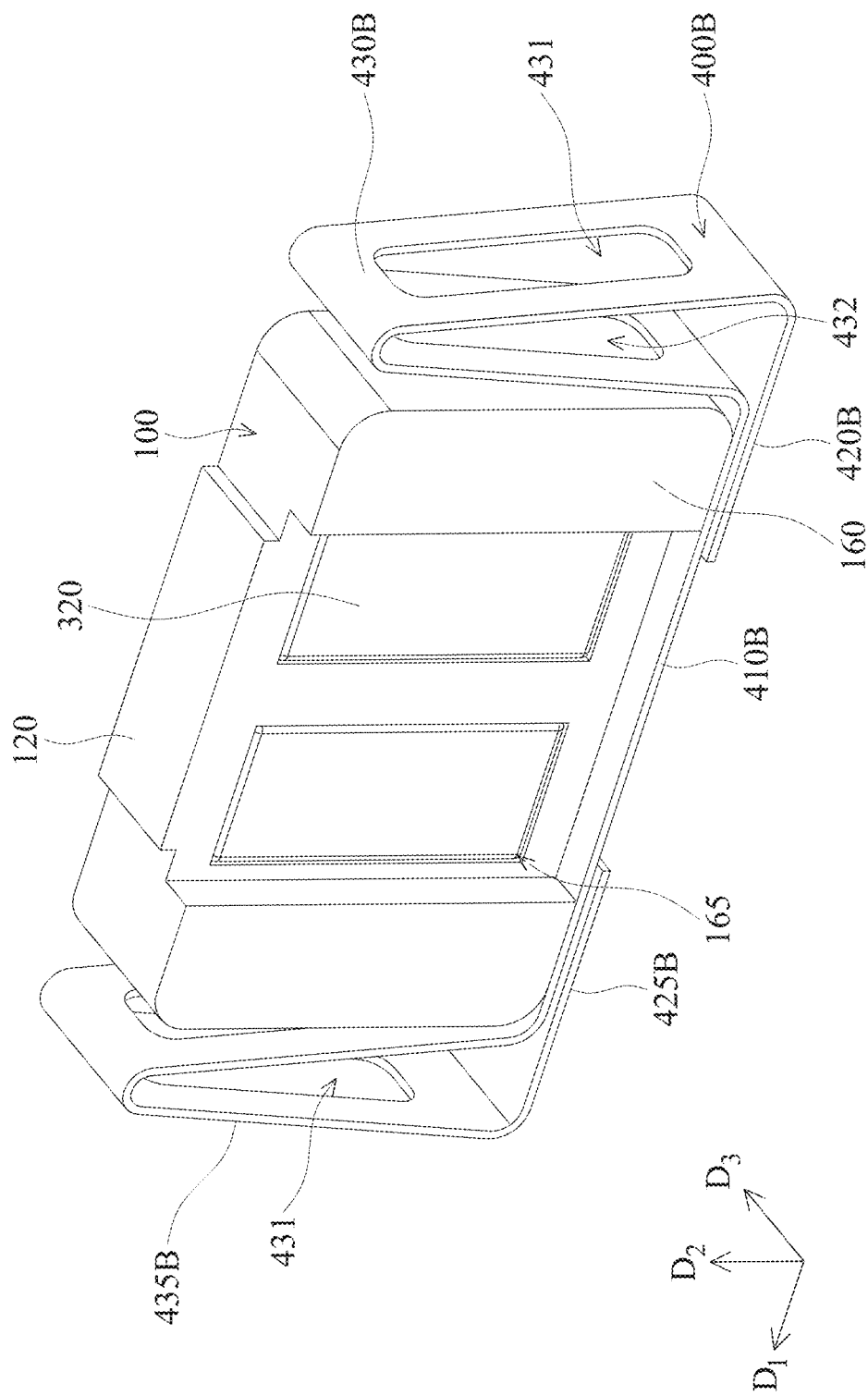
FIG. 6B is a perspective view of a portion of the tactile feedback mechanism according to some embodiments of the present disclosure, showing the movable portion, the connecting assembly, and the magnetic assembly, wherein the connecting assembly includes the first opening and the second opening.

According to some embodiments of the present disclosure, FIG. 6B shows a perspective view of the movable portion 100, the magnetic assembly 320, and the connecting assembly 400B. In the embodiment shown in FIG. 6B, the first elastic portion 430B and the second elastic portion 435B each have a first opening 431 and a second opening 432, respectively. The first opening 431 and the second opening 432 are independent structures formed on the first elastic portion 430B and the second elastic portion 435B. That is to say, the first elastic portion 430B and the second elastic portion 435B each have a first opening 431 and a second opening 432, and the structure of the first opening 431 is not affected by the structure of the second opening 432, and vice versa. This arrangement may reduce the elastic coefficient of the connecting assembly 400B, so as to increase the vibration intensity of the tactile feedback mechanism 10, thereby improving the performance of the tactile feedback mechanism 10.

Figure 6C:
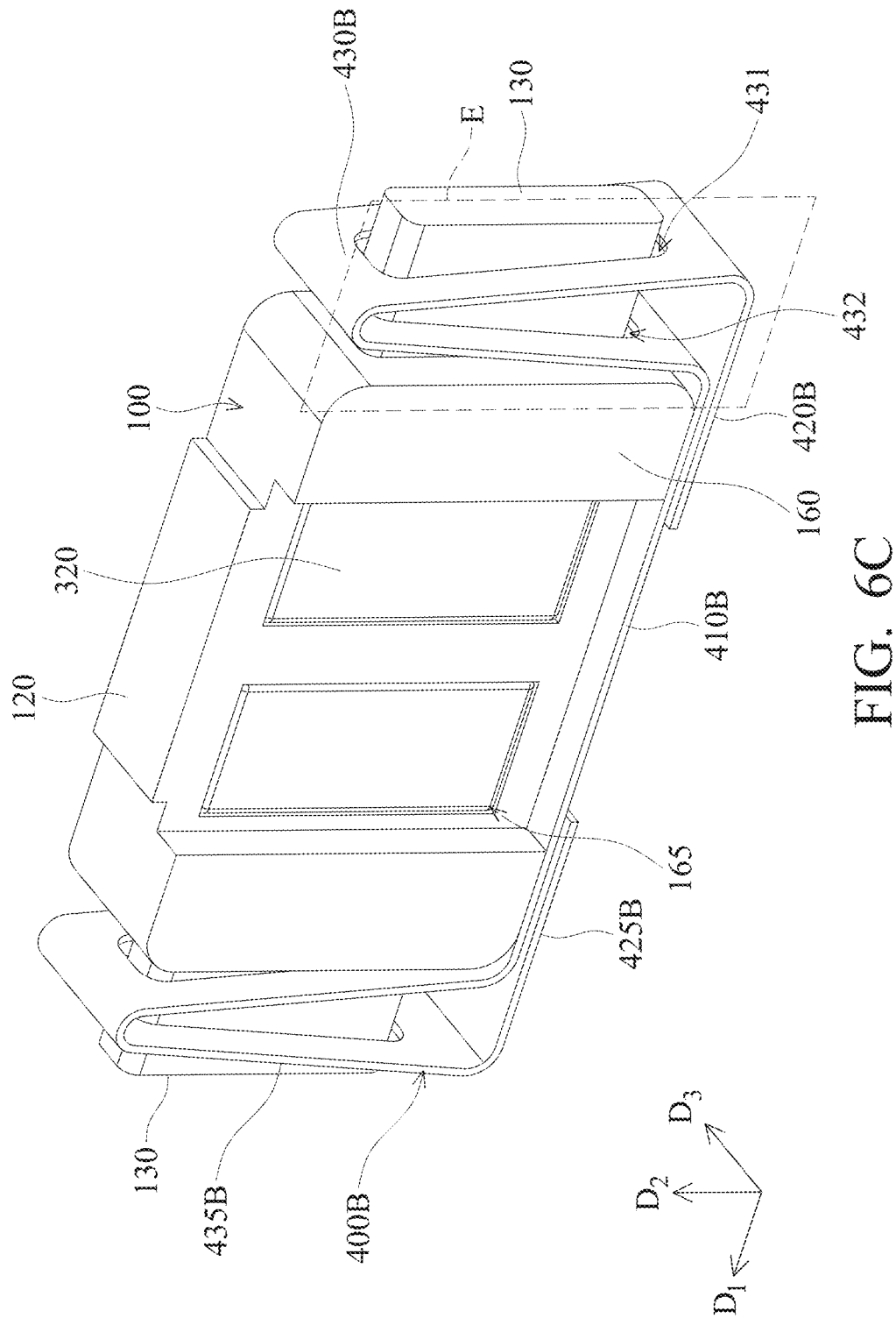
FIG. 6C is a perspective view of a portion of the tactile feedback mechanism according to some embodiments of the present disclosure, showing the movable portion, the connecting assembly, and the magnetic assembly, wherein the movable portion includes the third stopper portion.

According to some embodiments of the present disclosure, FIG. 6C shows a perspective view of the movable portion 100, the magnetic assembly 320, and the connecting assembly 400B. In the embodiment shown in FIG. 6C, the movable portion 100 includes two third stopper portions 130, and the first elastic portion 430B and the second elastic portion 435B each have a first opening 431 and a second opening 432.

As shown in FIG. 6C, the third stopper portion 130 is a protruding structure on the two surfaces of the movable portion 100 near the third sidewall 213 (not shown in FIG. 6C) and the fourth sidewall 214 (not shown in FIG. 6C). The first openings 431 and the second openings 432 are formed on the first elastic portion 430B and the second elastic portion 435B as shown in FIG. 6B. The two third stopper portions 130 respectively pass through the first openings 431 and the second openings 432 on the first elastic part 430B and the second elastic part 435B.

This configuration not only reduces the elastic coefficient of the connecting assembly 400B, but also increases the mass of the movable portion 100, which may increase the vibration intensity and the maximum acceleration of the tactile feedback mechanism 10, thereby improving the performance of the tactile feedback mechanism 10.

Figure 7A:
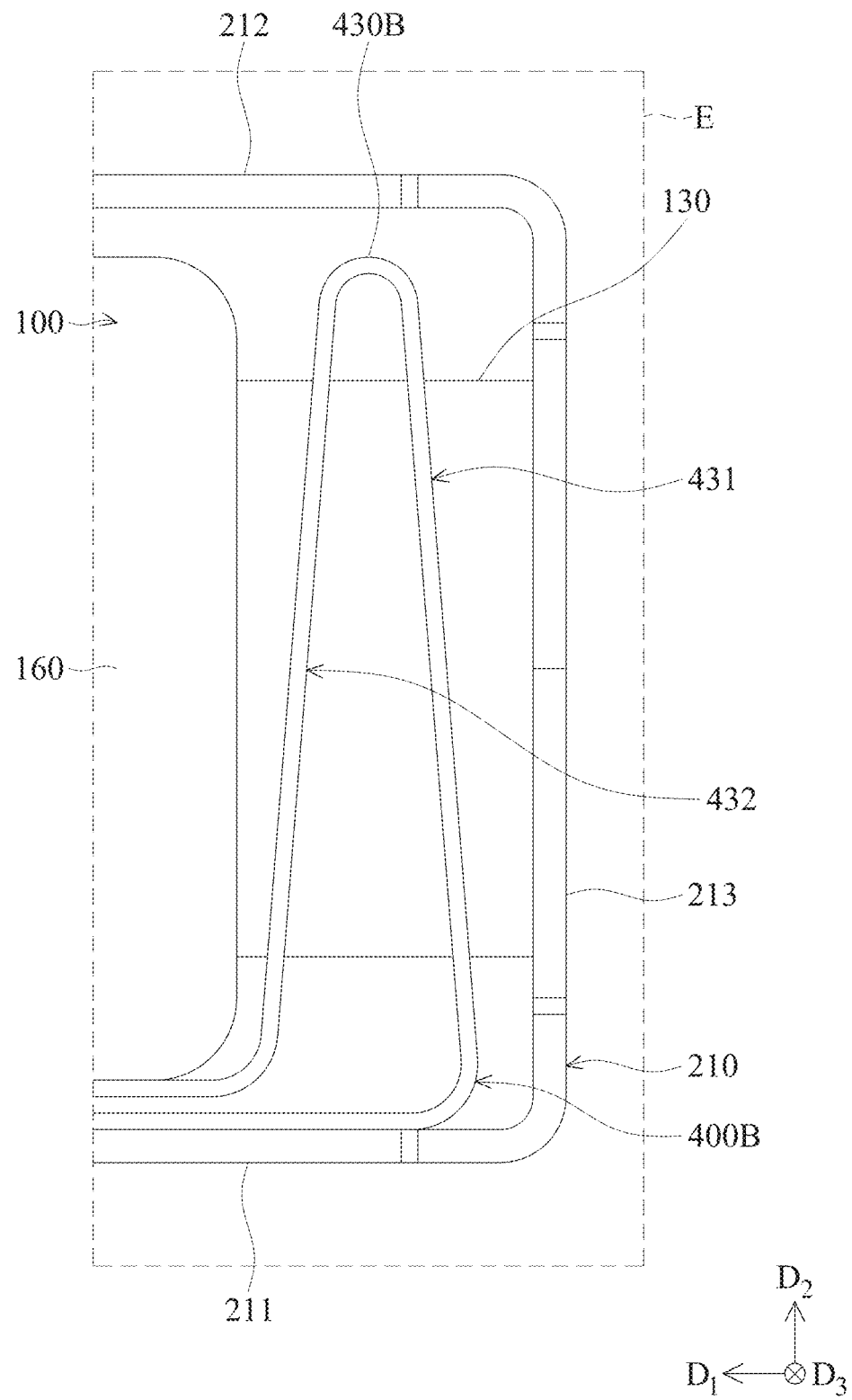
FIG. 7A is a partial front view of the tactile feedback mechanism in the third limiting position according to some embodiments of the present disclosure.
Figure 7B:
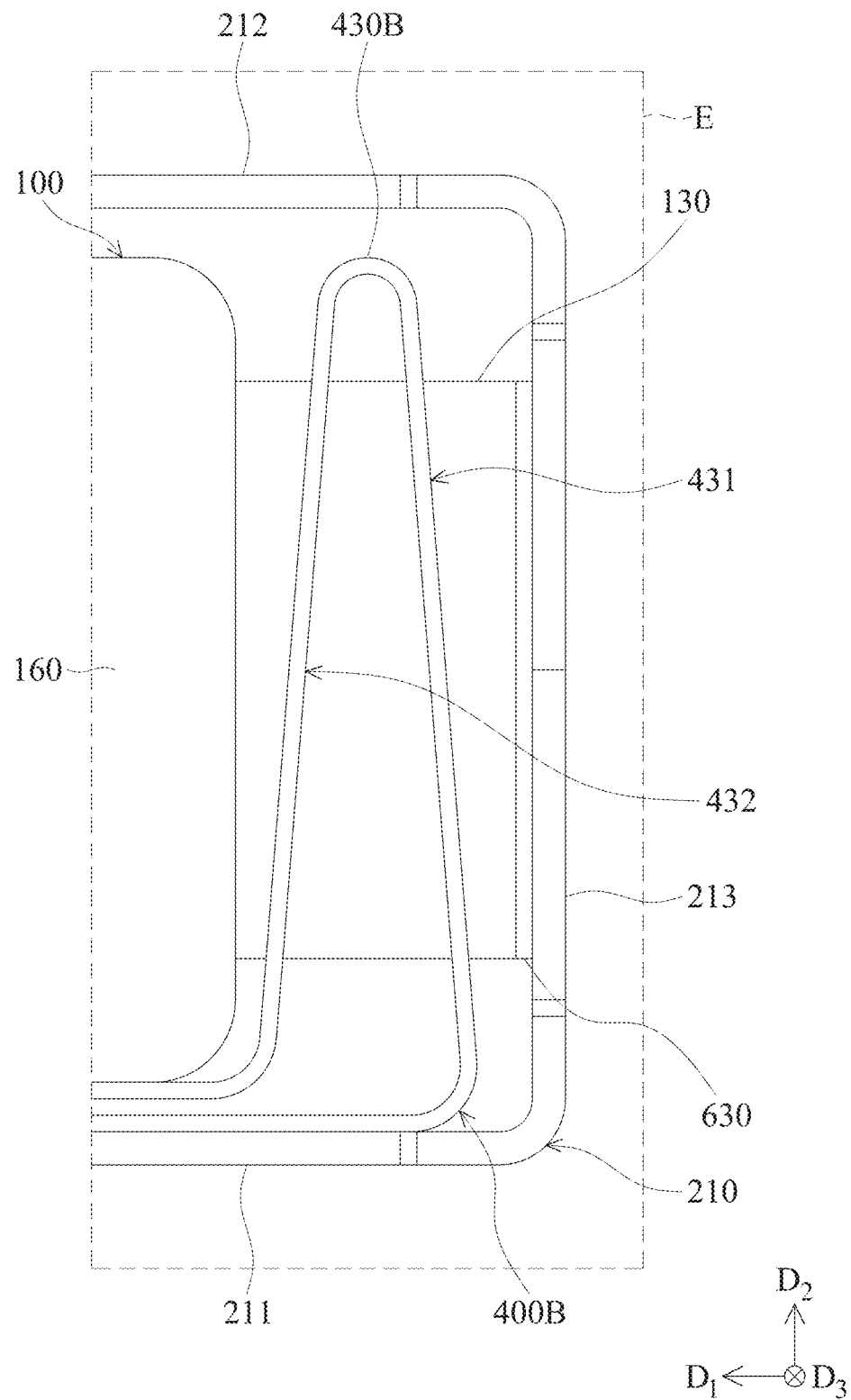
FIG. 7B is another partial front view of the tactile feedback mechanism in the third limiting position according to some embodiments of the present disclosure, including the third buffer component.

According to some embodiments of the present disclosure, FIGS. 7A and 7B show partial front views of the movable portion 100 in the frame E of FIG. 6C in the third limiting position. When the movable portion 100 is in the third limiting position, the third stopper portion 130 limits the range of movement of the movable portion 100 relative to the fixed portion 200 (not shown). As shown in FIGS. 7A and 7B, in the third limiting position, the third stopper portion 130 may directly or indirectly contact the third sidewall 213 of the housing 210.

In the embodiment shown in FIG. 7A, the third stopper portion 130 directly contacts the third sidewall 213 in the third limiting position. The embodiment shown in FIG. 7B further includes a third buffer component 630. The third buffer component 630 is made of plastic material, and may be disposed on the third stopper portion 130 or the third sidewall 213. When the movable portion 100 is in the third limiting position, the third stopper portion 130 indirectly contacts the third sidewall 213 via the third buffer component 630.

According to some embodiments of the present disclosure, another third stopper portion 130 (shown in FIG. 6C) close to the fourth sidewall 214 (shown in FIG. 4B) may also directly or indirectly contact the fourth sidewall 214 via another buffer element in a fourth limiting position in a similar manner as described above.

Figure 8A:
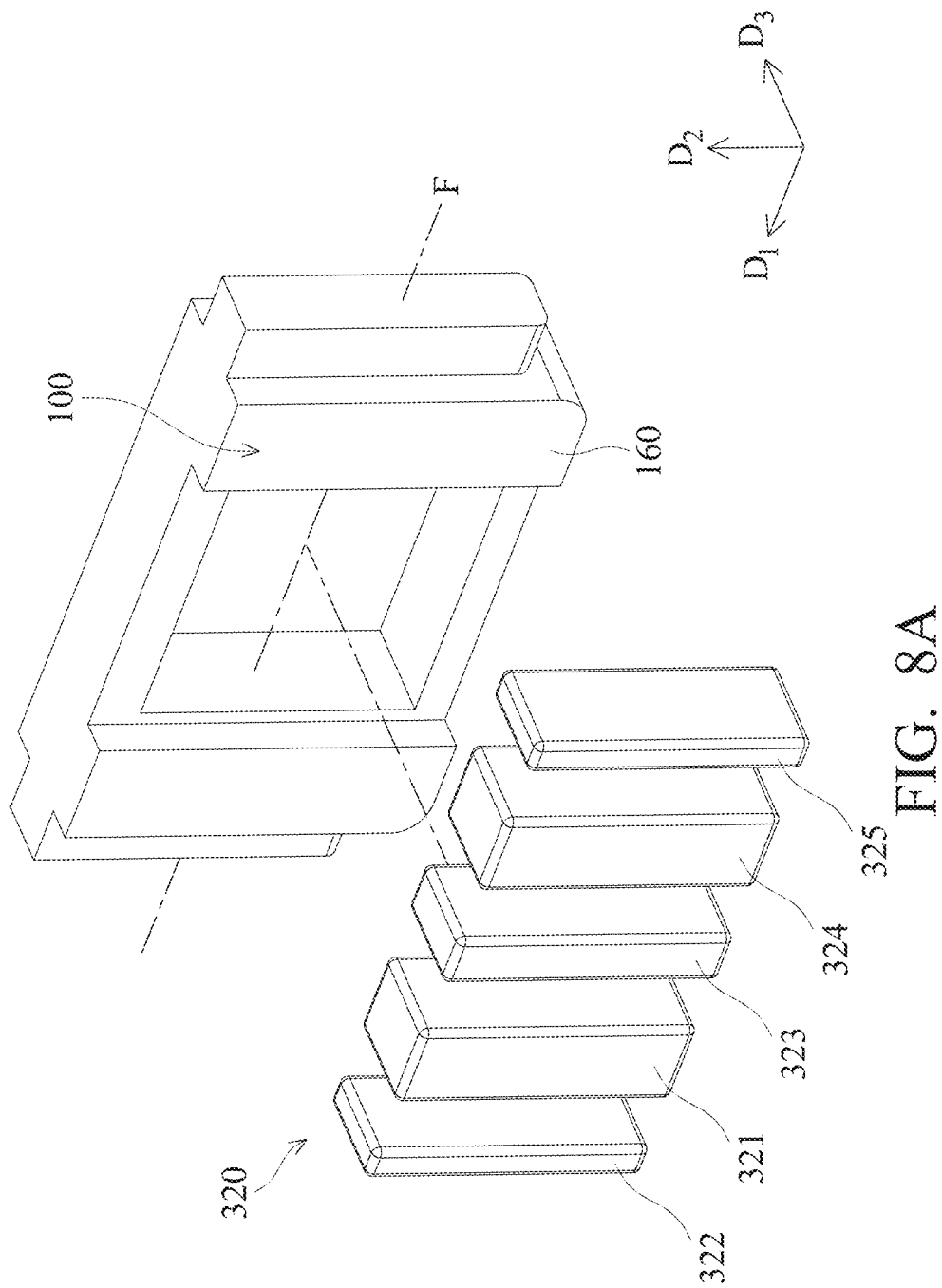
FIG. 8A is an exploded view of the movable portion and the magnetic assembly according to some embodiments of the disclosure.

Referring to FIG. 8A, the magnetic assembly 320 of the present disclosure may also be a Halbach array. In FIG. 8A, an exploded view of the lower portion 160 of the movable portion 100 and the magnetic assembly 320 can be seen. In this embodiment, the magnetic assembly 320 includes a first magnetic component 321, a second magnetic component 322, a third magnetic component 323, a fourth magnetic component 324, and a fifth magnetic component 325. The arrangement of the magnetic assembly 320 in a Halbach array will be described in detail below.

Figure 8B:
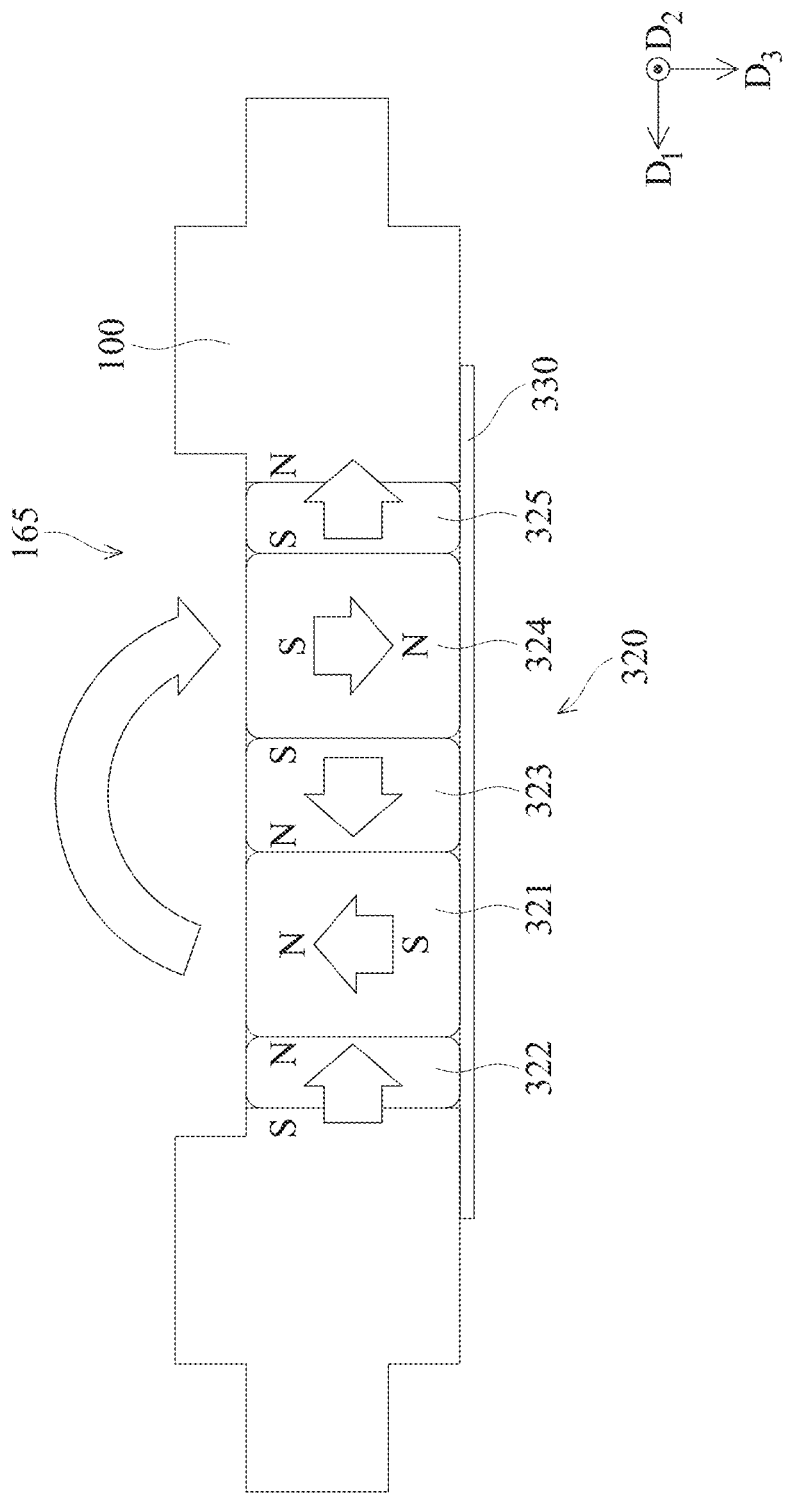
FIG. 8B is a cross-sectional view of FIG. 8A taken along line F according to some embodiments of the present disclosure.

FIG. 8B shows a cross-sectional view of FIG. 8A taken along line F. The movable portion 100 and the magnetic assembly 320 can be seen. Hereinafter, the first magnetic component 321, the second magnetic component 322, the third magnetic component 323, and the fourth magnetic component 324 are used as examples to illustrate the arrangement of a Halbach array. The first magnetic component 321 has a first magnetic pole pair including an N pole and an S pole. The second magnetic component 322 has a second magnetic pole pair including an N pole and an S pole. The third magnetic component 323 has a third magnetic pole pair including an N pole and an S pole. The fourth magnetic component 324 has a fourth magnetic pole pair including an N pole and an S pole.

The first magnetic pole pair, the second magnetic pole pair, the third magnetic pole pair, and the fourth magnetic pole pair are arranged in different orientations, respectively. The magnetic poles of the second magnetic pole pair and the third magnetic pole pair are arranged along the direction of the first axis D1, and the magnetic poles of the first magnetic pole pair and the fourth magnetic pole pair are arranged along the direction of the main axis D3.

The N pole of the second magnetic pole pair is closer to the first magnetic component 321 than the S pole of the second magnetic pole pair, and the N pole of the third magnetic pole pair is closer to the first magnetic component 321 than the S pole of the third magnetic pole pair. The S pole of the first magnetic pole pair is closer to the magnetic permeability component 330 than the N pole of the first magnetic pole pair, and the N pole of the first magnetic pole pair is closer to the recess portion 165 that may accommodate the coil 310 than the S pole of the first magnetic pole pair. The S pole of the fourth magnetic pole pair is closer to the recess portion 165 that may accommodate the coil 310 than the N pole of the fourth magnetic pole pair, and the N pole of the fourth magnetic pole pair is closer to the magnetic permeability component 330 than the S pole of the fourth magnetic pole pair.

In this configuration, the magnetic field of the magnetic assembly 320 on the side of the recess portion 165 that can accommodate the coil 310 may be significantly enhanced, and the generated magnetic field is shown by the arrow near the recess portion 165 in FIG. 8B. With this arrangement, the number of coils required may be reduced, and the effect of miniaturization may be achieved. This arrangement may also generate a stronger magnetic field with less magnetic components, which would normally require more of the general magnetic assembly 320 to achieve, thereby improving the performance.

Figure 9:
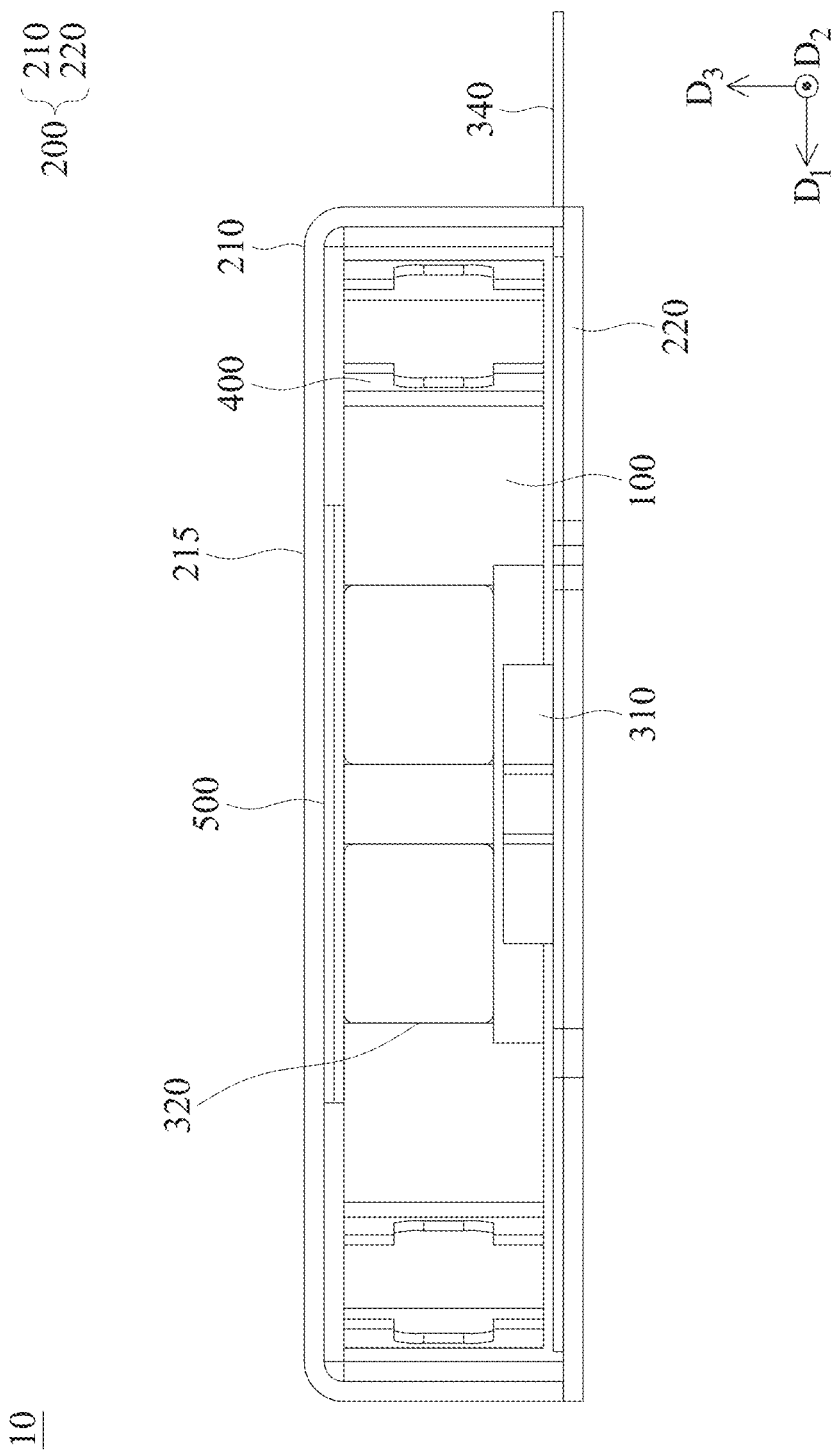
FIG. 9 is a cross-sectional side view of the tactile feedback mechanism according to some embodiments of the disclosure.

According to some embodiments of the present disclosure, FIG. 9 shows a cross-sectional side view of the tactile feedback mechanism 10. The movable portion 100, the housing 210, the base 220, the coil 310, the magnetic assembly 320, the printed circuit board 340, and the connecting assembly 400 can be seen. In some embodiments, the tactile feedback mechanism 10 may have a damping component 500 in the non-moving axial direction (for example, the direction of the main axis D3 in this embodiment). The damping component 500 may be located between the movable portion 100 and the fixed portion 200 as shown in FIG. 9. The addition of the damping component 500 may adjust the motion parameters of the tactile feedback mechanism 10, so that the disclosed device may increase stability and reduce noise.

The present disclosure provides a tactile feedback mechanism. The movable portion is movably connected to the fixed portion via the connecting assembly. The driving assembly drives the movable portion to move relative to the fixed portion to vibrate. The present disclosure achieves the effects of miniaturization and easy assembly by the different configurations of the movable portion and the connecting assembly. The present disclosure also increases the vibration intensity and maximum acceleration of the tactile feedback mechanism by regulating the elastic coefficient of the connecting assembly and increasing the mass of the movable portion, thereby improving the stability and performance of the tactile feedback mechanism.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. A tactile feedback mechanism, comprising:
a movable portion;
a fixed portion, wherein the movable portion is movable relative to the fixed portion;
a driving assembly configured to drive the movable portion to move relative to the fixed portion; and
a connecting assembly, wherein the movable portion is movably connected to the fixed portion via the connecting assembly, and the connecting assembly has a metal material;
wherein the connecting assembly comprises:
a first fixed end for the movable portion, fixedly connected to the movable portion;
a first fixed end for the fixed portion, fixedly connected to the fixed portion;
a first elastic portion, wherein the first fixed end for the movable portion is movably connected to the first fixed end for the fixed portion via the first elastic portion;
a second fixed end for the fixed portion, fixedly connected to the fixed portion; and
a second elastic portion, wherein the first fixed end for the movable portion is connected to the second fixed end for the fixed portion via the second elastic portion;
wherein the first fixed end for the fixed portion is connected to the second fixed end for the fixed portion via the first fixed end for the movable portion, and the first fixed end for the movable portion, the first fixed end for the fixed portion, and the second fixed end for the fixed portion are formed in one piece, the first fixed end for the fixed portion and the second fixed end for the fixed portion are arranged along a first axis;
wherein the fixed portion comprises a first sidewall, the first fixed end for the fixed portion and the second fixed end for the fixed portion are disposed on the first sidewall, the first fixed end for the movable portion, the first fixed end for the fixed portion, the second fixed end for the fixed portion, and the first sidewall have plate-shaped structures, and the first fixed end for the movable portion is located between the movable portion and the first sidewall.

2. The tactile feedback mechanism as claimed in claim 1, wherein the first elastic portion has a metal material;
wherein the movable portion has a metal material, and the metal material of the first elastic portion is different from the metal material of the movable portion, and the density of the metal material of the first elastic portion is lower than the density of the metal material of the movable portion.

3. The tactile feedback mechanism as claimed in claim 2, wherein the driving assembly comprises:
a coil;
a magnetic assembly, corresponding to the coil;
a magnetic permeability component, fixedly disposed on the magnetic assembly and having a magnetic permeability material;
wherein the magnetic permeability component is used to adjust the distribution of the magnetic field generated by the magnetic assembly, and the coil and the magnetic assembly are arranged along a direction of a main axis, the movable portion and the coil are at least partially overlapped when viewed along a direction perpendicular to the direction of the main axis.

4. The tactile feedback mechanism as claimed in claim 3, wherein the magnetic assembly further comprises a first magnetic component, a second magnetic component, and a third magnetic component, wherein the second magnetic component and the third magnetic component correspond to the first magnetic component, the first magnetic component, the second magnetic component, and the third magnetic component are arranged along the first axis, wherein the first magnetic component has a first magnetic pole pair comprising an N pole and an S pole, and the second magnetic component has a second magnetic pole pair comprising an N pole and an S pole, the third magnetic component has a third magnetic pole pair comprising an N pole and an S pole, the first magnetic pole pair, the second magnetic pole pair, and the third magnetic pole pair are arranged in different orientations respectively, the magnetic pole pairs of the second magnetic pole pair and the third magnetic pole pair are arranged along the first axis, and the N pole of the second magnetic pole pair is closer to the first magnetic component than the S pole of the second magnetic pole pair, the N pole of the third magnetic pole pair is closer to the first magnetic component than the S pole of the third magnetic pole pair, and the S pole of the first magnetic pole pair is closer to the magnetic permeability component than the N pole of the first magnetic pole pair, the N pole of the first magnetic pole pair is closer to the coil than the S pole of the first magnetic pole pair.

5. The tactile feedback mechanism as claimed in claim 1, wherein the connecting assembly further comprises:
   a second fixed end for the movable portion, fixedly connected to the movable portion;
   wherein the second fixed end for the movable portion is connected to the first fixed end for the fixed portion via the second elastic portion;
   wherein the first fixed end for the movable portion is connected to the second fixed end for the movable portion via the first fixed end for the fixed portion, and the first fixed end for the movable portion, the first fixed end for the fixed portion, and the second fixed end for the movable portion are formed in one piece.

6. The tactile feedback mechanism as claimed in claim 5, wherein the first fixed end for the fixed portion is disposed on the first sidewall, and the movable portion comprises a first stopper portion for limiting the range of movement of the movable portion relative to the fixed portion, the first stopper portion directly or indirectly contacts the first fixed end for the fixed portion when the movable portion is in a first limiting position.

7. The tactile feedback mechanism as claimed in claim 6, further comprising a first buffer component, the first buffer component has a plastic material, and the first buffer component is fixedly disposed on the first stopper portion or the first fixed end for the fixed portion.

8. The tactile feedback mechanism as claimed in claim 6, wherein the movable portion comprises a first connecting portion and a second connecting portion, the first fixed end for the movable portion is fixed to the first connecting portion, and the second fixed end for the movable portion is fixed to the second connecting portion, wherein the first connecting portion and the second connecting portion both have a recessed structure.

9. The tactile feedback mechanism as claimed in claim 8, wherein the first connecting portion comprises a first connecting surface, the second connecting portion comprises a second connecting surface, the first fixed end for the movable portion is disposed on the first connecting surface, the second fixed end for the movable portion is disposed on the second connecting surface, the fixed portion comprises a second sidewall, the first fixed end for the movable portion and the second fixed end for the movable portion are arranged along the first axis, and the first connecting surface and the second connecting surface face the second sidewall.

10. The tactile feedback mechanism as claimed in claim 5, further comprising a damping component, the movable portion is movably connected to the fixed portion via the damping component, wherein the damping component is flexible, and the damping component has a plastic material, the elastic coefficient of the damping component is lower than the elastic coefficient of the first elastic portion.

11. The tactile feedback mechanism as claimed in claim 5, wherein the movable portion comprises a second stopper portion, for limiting the range of movement of the movable portion relative to the fixed portion, and the second stopper portion directly or indirectly contacts the second sidewall of the fixed portion when the movable portion is in a second limiting position.

12. The tactile feedback mechanism as claimed in claim 11, further comprising a second buffer component, wherein the second buffer component has a plastic material, and the second buffer component is fixedly disposed on the second stopper portion or the second sidewall.

13. The tactile feedback mechanism as claimed in claim 1, wherein when the first fixed end for the movable portion directly or indirectly contacts both the first fixed end for the fixed portion and the second fixed end for the fixed portion, the range of movement of the movable portion relative to the fixed portion is limited.

14. The tactile feedback mechanism as claimed in claim 13, further comprising a first buffer component, the first buffer component has a plastic material, and the first buffer component is fixedly disposed on the first fixed end for the movable portion or both the first fixed end for the fixed portion and the second fixed end for the fixed portion.

15. The tactile feedback mechanism as claimed in claim 13, wherein the first elastic portion and the second elastic portion each have a pointed shape when viewed along a direction of a main axis, and the first elastic portion and the second elastic portion are mirror-symmetrical with each other relative to the movable portion.

16. The tactile feedback mechanism as claimed in claim 15, wherein the connecting assembly further comprises an adjusting component, the adjusting component has a plate-like structure and is disposed on the first elastic portion for adjusting the elastic coefficient of the first elastic portion, the Young's modulus of the adjusting component is greater than the Young's modulus of the first elastic portion, and the first elastic portion and the adjusting component have different metal materials.

17. The tactile feedback mechanism as claimed in claim 15, wherein the first elastic portion comprises a first opening and a second opening, and the movable portion further comprises a third stopper portion passing through the first opening and the second opening, wherein the first opening and the second opening have independent structures, and the third stopper portion directly or indirectly contacts the third sidewall of the fixed portion when the movable portion is in a third limiting position.

18. The tactile feedback mechanism as claimed in claim 17, further comprising a third buffer component, the third buffer component is fixedly disposed on the third stopper portion or the third sidewall of the fixed portion, and the third buffer component has a plastic material.

* * * * *